(12) United States Patent
Nasserbakht et al.

(10) Patent No.: US 11,238,171 B1
(45) Date of Patent: Feb. 1, 2022

(54) INTELLIGENT CONNECTION MECHANISM

(71) Applicant: ENORCOM Corporation, Los Altos, CA (US)

(72) Inventors: Mitra Nasserbakht, Los Altos, CA (US); Gitty N. Nasserbakht, Los Altos, CA (US)

(73) Assignee: ENORCOM Corporation, Los Altos, CA (US)

( * ) Notice: Subject to any disclaimer, the term of this patent is extended or adjusted under 35 U.S.C. 154(b) by 662 days.

(21) Appl. No.: 16/042,835

(22) Filed: Jul. 23, 2018

Related U.S. Application Data

(63) Continuation of application No. 14/821,638, filed on Aug. 7, 2015, now Pat. No. 10,055,597.

(60) Provisional application No. 62/034,564, filed on Aug. 7, 2014.

(51) Int. Cl.
*G06F 21/60* (2013.01)
*G06F 13/40* (2006.01)
*H04L 29/08* (2006.01)
*B21D 39/00* (2006.01)

(52) U.S. Cl.
CPC ........... *G06F 21/606* (2013.01); *B21D 39/00* (2013.01); *G06F 13/4068* (2013.01); *H04L 67/141* (2013.01); *Y10T 29/4978* (2015.01); *Y10T 29/49764* (2015.01); *Y10T 29/49778* (2015.01)

(58) Field of Classification Search
CPC ... G06F 21/606; G06F 13/4068; B21D 39/00; H04L 67/141; Y10T 29/49764; Y10T 29/49778; Y10T 29/4978
See application file for complete search history.

(56) References Cited

U.S. PATENT DOCUMENTS

| | | | |
|---|---|---|---|
| 8,214,108 B2 | 7/2012 | Post, II et al. | |
| 10,055,597 B2 * | 8/2018 | Nasserbakht | B21D 39/00 |
| 2004/0088437 A1 * | 5/2004 | Stimac | H04L 41/0816 709/249 |
| 2004/0209489 A1 | 10/2004 | Clapper | |
| 2006/0002110 A1 | 1/2006 | Dowling et al. | |
| 2006/0271658 A1 * | 11/2006 | Beliles, Jr. | H04L 45/306 709/223 |
| 2009/0174990 A1 | 7/2009 | Ligtenberg et al. | |
| 2010/0318241 A1 | 12/2010 | Post, II et al. | |
| 2011/0131358 A1 * | 6/2011 | Ganesh | G06F 16/638 710/304 |
| 2013/0065407 A1 | 3/2013 | Schichl et al. | |
| 2014/0203945 A1 | 7/2014 | Benner et al. | |
| 2016/0042188 A1 | 2/2016 | Nasserbakht et al. | |

FOREIGN PATENT DOCUMENTS

| | | |
|---|---|---|
| CN | 101273499 A | 9/2008 |
| CN | 101663634 A | 3/2010 |
| CN | 101728703 A | 6/2010 |
| CN | 102801044 A | 11/2012 |
| CN | 102806555 A | 12/2012 |

(Continued)

*Primary Examiner* — Henry Tsai
*Assistant Examiner* — John B Roche
(74) *Attorney, Agent, or Firm* — Schwegman Lundberg & Woessner, P.A.

(57) ABSTRACT

Intelligent connection systems disclosed herein perform autonomous connection mechanisms and provide secure connectors. A mobile device exemplifies one of the embodiments of the autonomous connection mechanism.

16 Claims, 25 Drawing Sheets

(56) References Cited

FOREIGN PATENT DOCUMENTS

| | | |
|---|---|---|
| CN | 106796567 A | 5/2017 |
| CN | 112948305 A | 6/2021 |
| EP | 2453278 A2 | 5/2012 |
| EP | 3178008 B1 | 12/2018 |
| GB | 2502967 A | 12/2013 |
| IN | 201717007886 A | 7/2017 |
| WO | WO-2014062700 A1 | 4/2014 |

* cited by examiner

STACKED/ FOLDED SMALLER DISPLAYS SLIDE OUT/UNFOLD TO FORM LARGE DISPLAY

US 11,238,171 B1

INTELLIGENT CONNECTION MECHANISM

CLAIM OF PRIORITY

This application is a continuation of and claims the benefit of priority under 35 U.S.C. § 120 to U.S. patent application Ser. No. 14/821,638, filed on Aug. 7, 2015, which claims the benefit of U.S. Provisional Application No. 62/034,564, filed Aug. 7, 2014, each of which is incorporated by reference herein in its entirety.

BACKGROUND

As physical elements come together to form a connected system, there have been numerous innovations in connector technologies, from mechanically connecting any two inanimate objects together all the way to connecting sophisticated and costly technology-rich devices of today. Yet, the methodology and the act of making physical connections have remained fundamentally the same. Traditionally users of such physical elements attach them together by locating them individually and connecting them together manually through connectors or extension wires and forcing the connectors together to form a physically secure connection.

As connectors of the future require more pins, finer granularity and higher performance, such actions of humans pushing connectors together while misaligned using misappropriate amount of force distribution are the leading cause of an increasing amount of damage to high performance connectors, rendering their attached high-priced physical component damaged or useless.

Additionally, theft of information using standardized or proprietary connectors is facilitated by the connectors' lack of intelligence and inability to assess threats and protect residing information on any device accessible via a physical connector. Furthermore, security risks to any and all systems further accessible by that given device is enhanced by the physical connectors' inability to distinguish among allowed and disallowed connectors, devices, connections or connection times.

SUMMARY

Various embodiments involve connecting two or more physical elements. These elements may operate together in attached mode or may operate separately in detached mode or both. Physical connections may be made intelligent, providing a new class of connection technologies.

In some embodiments, physical connections may be facilitated without the need for user intervention by making such connections autonomously or automatically.

A connecting mechanism may be based on an algorithmic approach to locate and connect physical elements that need to connect together automatically.

One embodiment provides a connection mechanism based on the connectors aligning, abutting and forming a secure physical connection between two physical elements without exerting direct physical action by the user.

In a further embodiment a coding mechanism is provided for making such physical connections. This coding mechanism can be made programmable, hence, allowing intelligent management of connection types, connections allowed or refused as well as using the first aspect of the invention, connections facilitated. The user can be involved in programming the coding criteria for the connection mechanism while the connector intelligence performs the remaining parts of the algorithm automatically without requiring user's physical intervention.

In some cases, the required intelligent resides directly in the connection mechanism and in some embodiments, the intelligence managing the connection algorithm and actions reside in the attached physical component, or they each share a portion of the required circuitry, components, hardware or software.

In still further embodiments, coding in the connector mechanism provides connection facilitation, refusal, or modifications in the connector type. A hardware based security mechanism may be controlled by certain coding protocols that provide changes such as refusal to connect all the way to destroying the connector or device in case of certain conditions are met to provide data integrity, security, or avoid theft of information or access to functionality through physical access to information or devices.

BRIEF DESCRIPTION OF THE DRAWINGS

One or more embodiments of the present invention are illustrated by way of example and not limitation in the figures of the accompanying drawings, in which like references indicate similar elements and in which.

Most representations in figures or text of this disclosure mention attachment and detachment interchangeably. In cases where only one is depicted or elaborated, it is understood that similarly the opposite set of depictions and actions apply to perform the counterpart action or result.

DETAILED DESCRIPTION

Algorithmic Approach for Connecting Physical Elements

Figure 3:
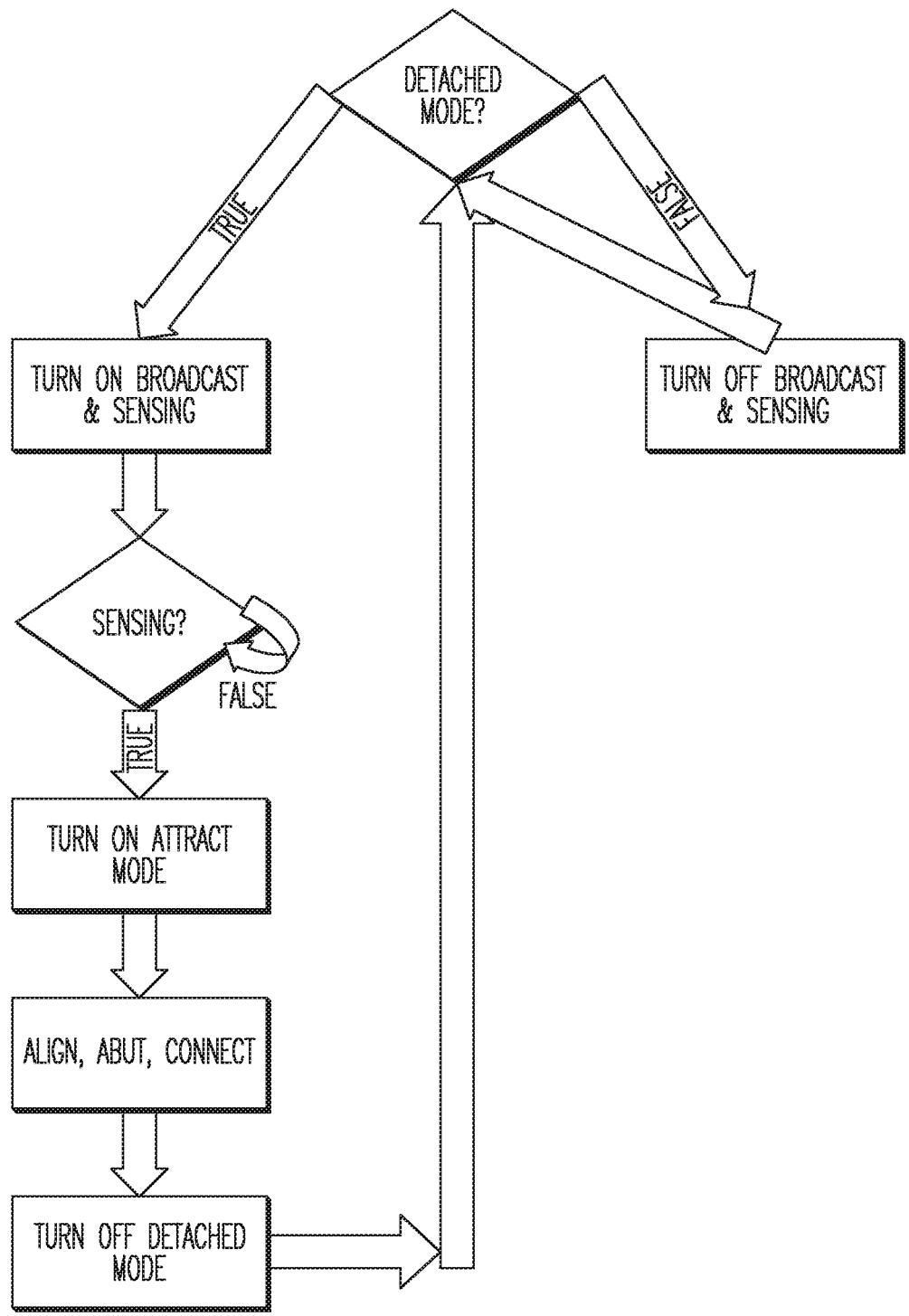
FIG. 3 is a flowchart showing one embodiment of the algorithm for automatically connecting a base unit to a detached component.
Figure 4:
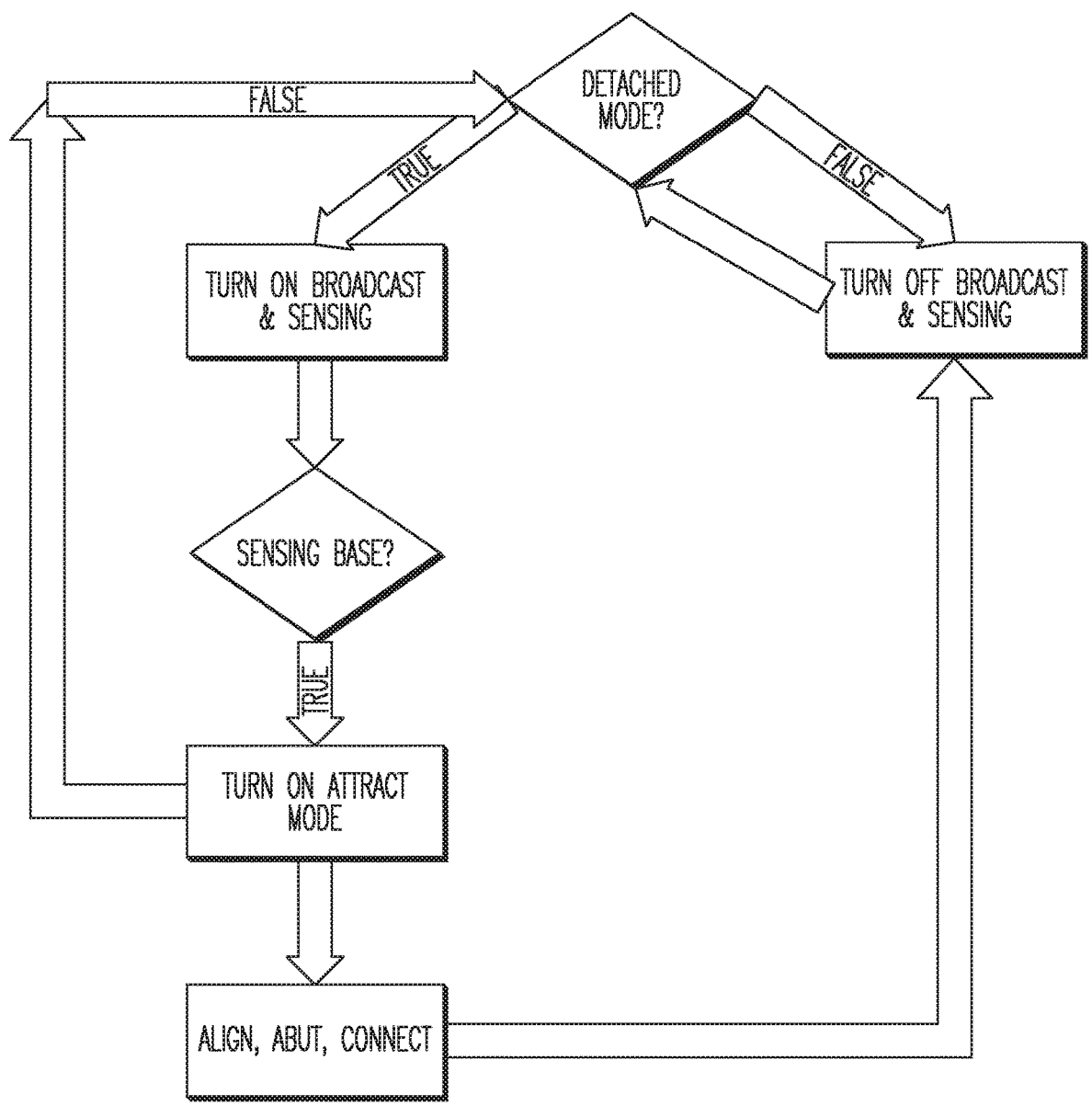
FIG. 4 is a flowchart showing one embodiment of the algorithm for automatically connecting a detached component to a base unit.
Figure 6:
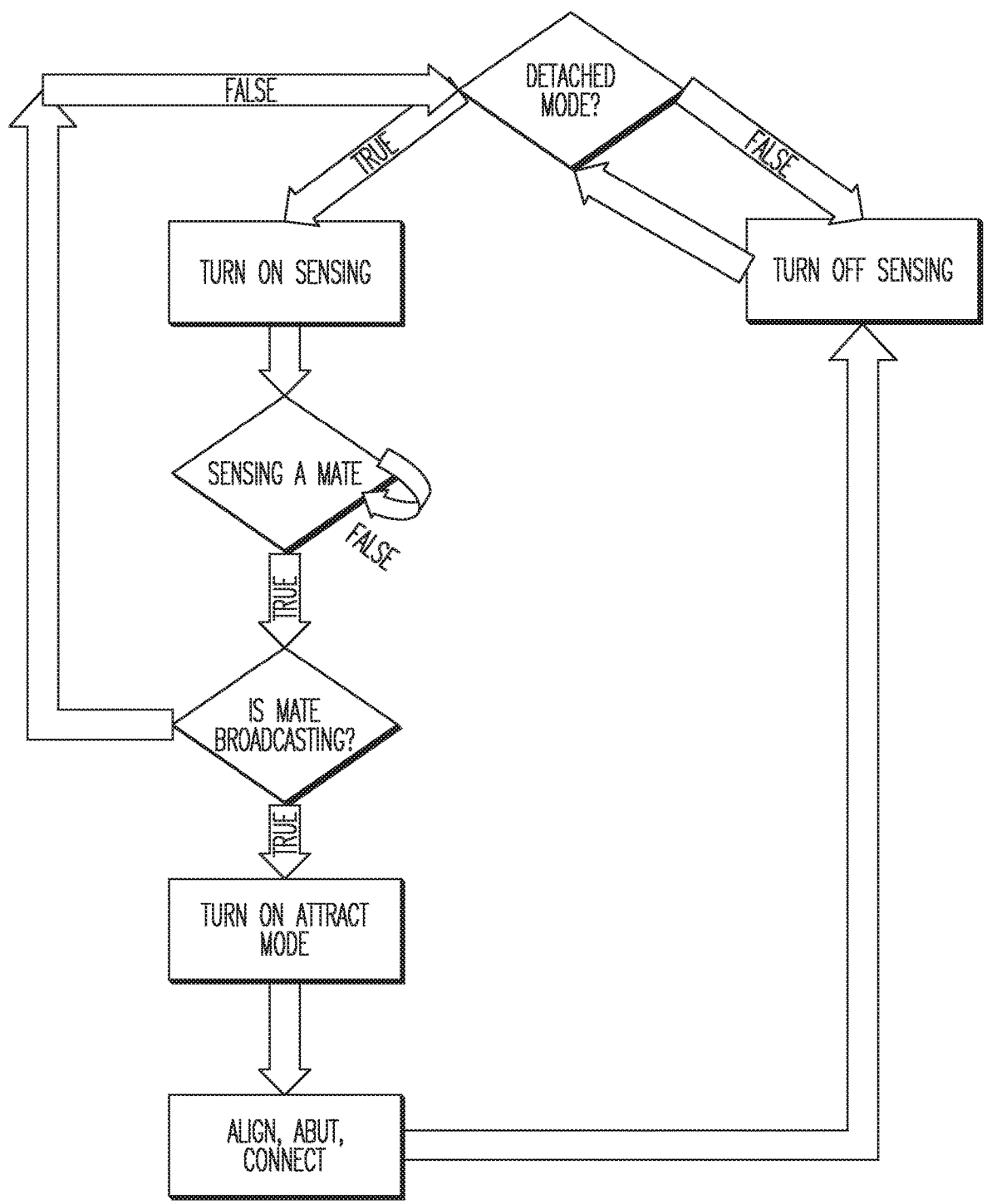
FIG. 6 is a flowchart showing one embodiment of the algorithm for automatically connecting a base unit to a detached component (with consideration to mate broadcasting).

A new approach to forming a secure connection among physical elements is introduced. In one embodiment, one or more detached components of a physical element forming a base unit are located and upon confirmation that the detached component(s) is ready to be connected to the base, forming an automated connection of the detached unit to the base unit by physically attracting the detached unit to the base unit, aligning the orientation, abutting the pins and forming a secure connection. In this embodiment, one or more of the detached components send out a broadcast indicator during the periods they wish to connect back to the base, while the base only looks for and senses such broadcast signals. The invention further allows for cases where the broadcast is emitted from the detached unit, however the request to connect is off, whereby the base unit is aware of the location of the detached unit but will not attempt to form a physical connection, unless the detached unit also broadcasting a request to connect indicator. FIG. 3 shows an embodiment wherein upon sensing a detached unit, it is automatically attracted to and autonomously connects to the base unit, while in another embodiment, as depicted in the example of FIG. 6, sensing a detached unit needs to be verified with the unit looking to connect back to the base, otherwise, the actual attachment will not commence. An algorithm for a base unit autonomously connecting to a detached component is illustrated. FIG. 4 depicts an example of the algorithm from the perspective of a detached unit looking to autonomously connect or attach to the base unit.

Figure 2:
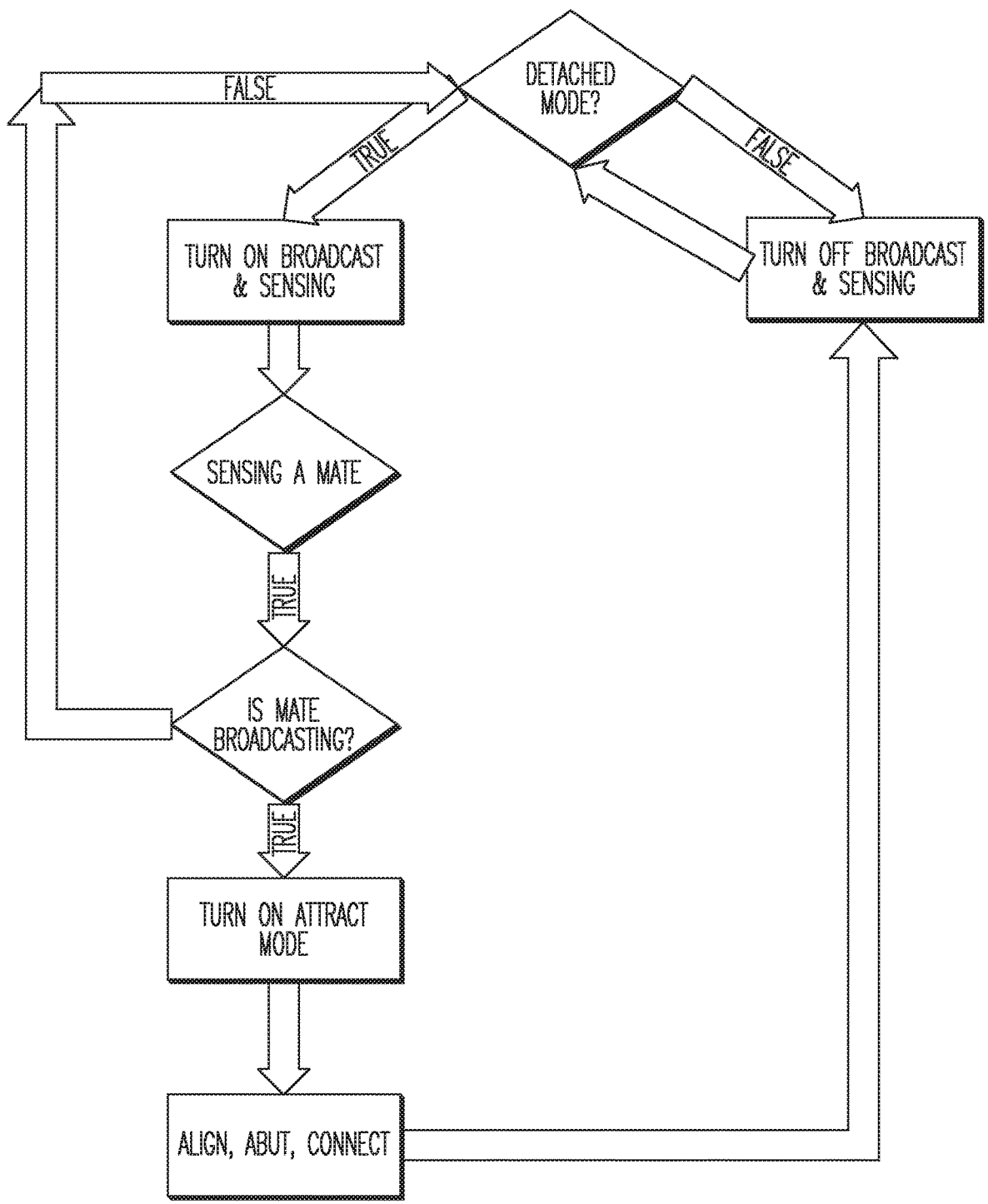
FIG. 2 is a flowchart showing one embodiment of the algorithm for automatically connecting two physical elements.

In another embodiment, the invention applies to two or more separate detached units which can come together and form a larger physical unit as depicted in FIG. 2, which depicts an algorithm for two physical elements to autonomously connect together. In this case, neither one of the units act as a base so they are symmetric in terms of their sensing and attracting capabilities. In this case upon being in detached mode and optionally upon desiring to connect to the other physical element, they each look for to sense other detached components while simultaneously broadcasting their own existence and optionally the request to physically connect to the other physical element.

In one embodiment, the request to connect is detected by holding or keeping a detached component within a predetermined range x of the base unit or holding or placing or keeping two physical elements capable of connecting together within the same predetermined range x of physical proximity to each other for more than a predetermined duration of time t. In this case, upon sensing a detached element by the base unit or by mutual sensing of two physical elements of each other in x range of distance, the connection mechanism waits for a period of t time elapse, upon which time, the connection mechanism turns on the attract mode including, aligning the two elements with proper orientation, abutting the pins together, forming a secure connection.

In another embodiment, or in an extension of the above embodiment, there is a predetermined distance of x2, which is shorter than the previously mentioned distance x, and by holding or placing or keeping the detached unit or the two physical units within that range, the two (detached to base or physical element 1 and physical element 2) are automatically immediately attracted together forming a connection without waiting for the additional time elapse.

Figure 5:
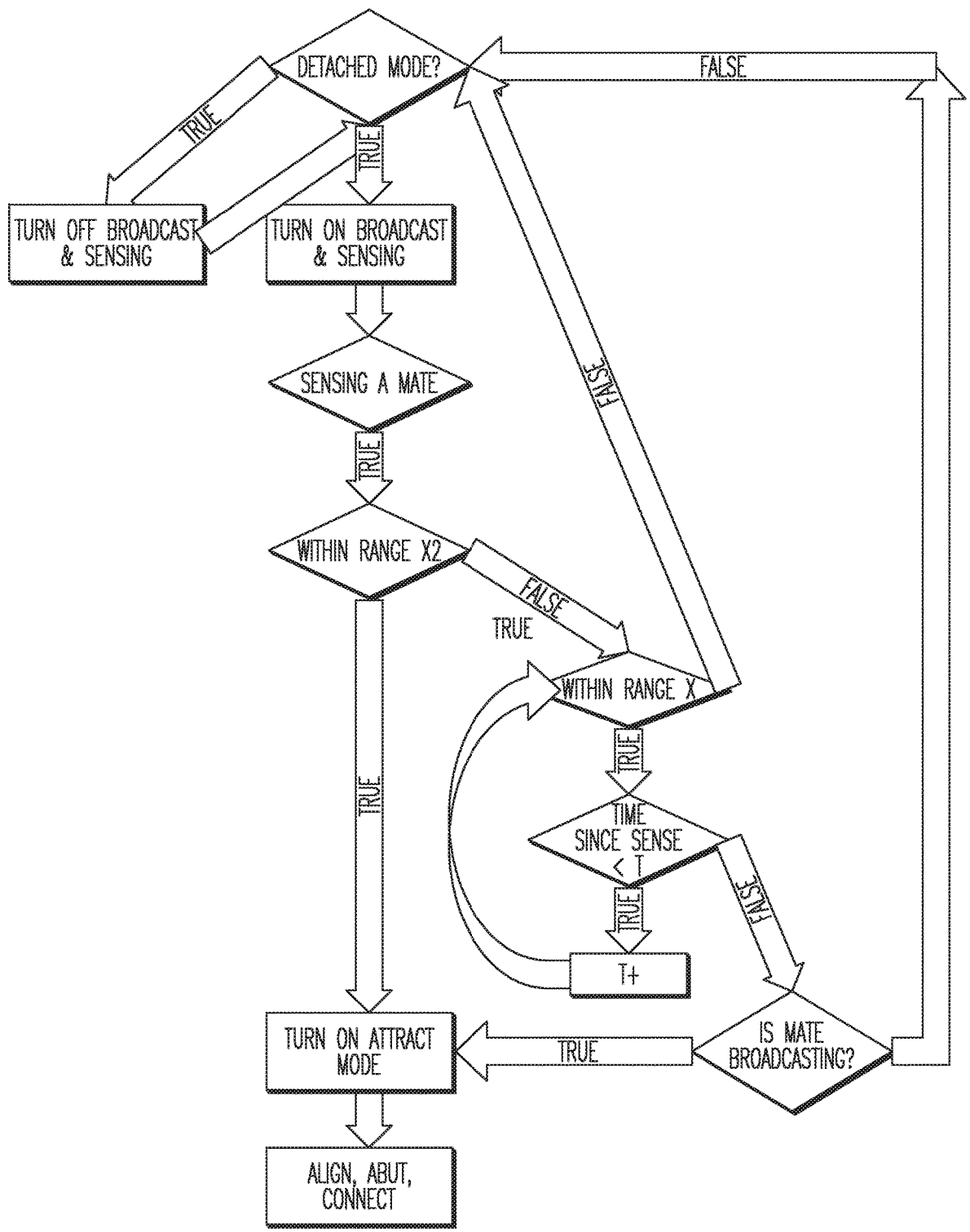
FIG. 5 is a flowchart showing one embodiment of the algorithm for automatically connecting two physical elements (with range and duration considerations).

Examples of the above embodiments are depicted in FIG. 5 which shows an algorithm for two physical elements autonomously connecting together.

In one embodiment, each respective physical element broadcasts its existence, location, request to connect or any additional information using low-energy consuming mechanisms. In case the broadcast indication includes such additional information, the connection mechanism uses this information which supersedes the proximity and duration of proximity information. In other embodiments or in absence of such explicit directives, the connection mechanism uses the aforementioned pre-programmed distance and time elapsed information to make explicit connections. In these cases, the elapsed time and target proximity ranges can be programmed by the user or the system and they may additionally be made dynamically variable. In various embodiments, the term "dynamically variable" may include one or more of a user setting a distance or time duration, varied based on historical patterns of making connections between different types of connectors, or even based on the type of connectors being coupled.

Forming a Secure Physical Connection

In this disclosure, several embodiments to forming a physical connection between two physical elements in an automated or autonomous fashion are presented. These are used to simplify the concept and are not in any way intended to be a comprehensive set.

In one embodiment, the connection mechanism includes turning on the attract mode. Entering the attract mode means enabling the attraction mechanism by which the two connectors as a whole, their respective housing units or their individual or specific pins are armed with an attractor force, which can attract or repel their counterpart depending on the mode of operation. The attractor force used and the arming mechanism depend on the particular embodiment chosen, design constraints or availability of technology at the time of implementation of the technique. The attractor force itself can include magnetic force of N/S polarity, +/− polarity of electric forms with charges in solid, fluid or gaseous mediums, on, surrounding, or adjacent to the specific area to be under attract/repel forces, special opposite coding on each surface or pin, special material coating on housing, chassis, connector pins on a given connector with the coating with attractive or repelling properties on another connector; among other such implementations to provide attraction (repelling) mode and its desired properties.

Figure 10A:
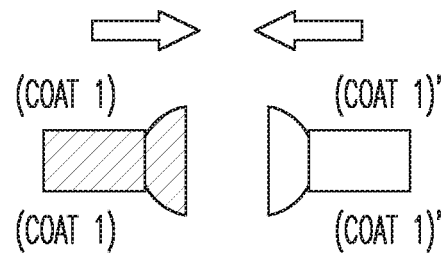
FIGS. 10A and 10B show block diagram representations of several embodiments of connection points with oppositely coated, similarly coated, oppositely colored, similarly colored connections enabling attraction and repelling based on material or visual properties of the connection point.
Figure 10A:
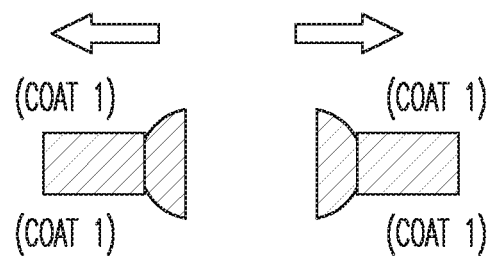
Figure 10B:
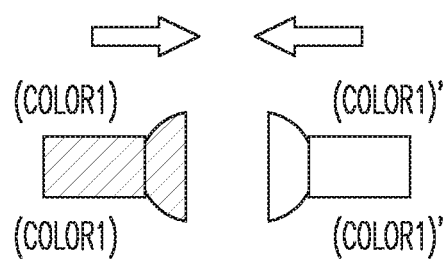
Figure 10B:
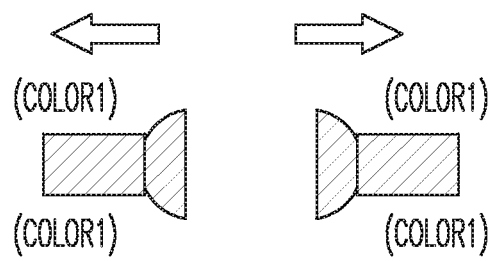

As an example, the attract/repel forces of specially coated pins with opposite/similar polarity materials as well as an opposite/similar color coding for commencing the attract/repel phase of the connection scheme is depicted in FIGS. 10A (connection points with oppositely coded and similarly coded pinout) and 10B (connection points with oppositely colored similarly pinout). The connector can be equipped with visual sensing, detection or recognition based on predefined color, visual attributes accept/reject mechanism or such schemes are learned and changed on the fly.

In some implementations such as a case where you have a magnetically assisted connection mechanism, that magnetic connection, with all its limitations in a variety of physical connectors, stays on and in some cases causes potential operational difficulties, wear out of the magnetic force in time or other issues. In the present embodiment, the algorithmic approach to making a connection enables turning on and off the attract mode whereby controlling potentially high-powered attractive forces between two physical elements only for the duration that it is needed and saving energy and avoiding operational or interference difficulties for the rest of the operational life of the physical elements involved as well as overcoming interference issues with adjacent other unintended physical elements.

In one embodiment, the first phase of the connection mechanism is controlling the attract mode upon many conditions. Once the connection mechanism starts, it aligns the two elements in proper orientation ready for the next phase of forming a connection. Upon brining one or both of these elements to proper orientation, the next phase is abutment. In this case and for an electrical physical element as an example, abutment involves moving the first properly oriented element into such close proximity as to make a pin to pin connection either at this phase or ready for making a complete physical connection in the next phase of the connection mechanism. In cases where a secure connection is not yet established, a final connect phase is required in which after orientation and abutment, a direct attraction force automatically pushes the already abutted pins together forming the physical connection secure. In some cases for example, a properly abutted connection is sufficient, and the securing the connection phase involved closing a latch at the edge of the connector automatically so as to avoid a connection going out of alignment in the future. In such cases, the automatic detach mode of the mechanism would detach the secure latch automatically as a first phase of detaching the two physical elements of the detaching of a detached component from the base.

Furthermore, align, abut, connect phases can commence by aligning based on location information for each connector. A connector can be location-self-aware and only based on each connector aligning themselves to a predefined proper orientation, they can be made to align properly.

The phases of forming a secure physical connection automatically and without user intervention can be implemented in many different fashions.

As an example of a potential embodiment, align phase can be designated by a top-alignment indicator which will either place each element in a previously agreed upon mechanism in relation to an external standard. For example, in align phase and in case of two physical elements, the alignment can be agreed upon to be magnetic north orientation for both in relation to an external standard. In another case, it can be orienting the device based on global positioning system in the device or its cellular base station triangulation mechanism or other forms of future standards of orientation.

In another embodiment the align phase is designated by the alignment of the two physical elements or the detached element and the base element directly towards each other. In this case, the top-alignment indicator is present in each element and seeks its mate in the other element. In case of a magnetic or ferromagnetic element placed in top of each device, the opposite polarity on top for both or the same polarity one on top of one device while the other of same polarity place on the exact opposite orientation of the other device (bottom) in this case, so attraction in the first case and the repelling in the second case will ensure proper orientation.

The alignment designators may need to be left or right or some other designator depending on the exact shape, material and implementation of the technique.

In some cases the alignment is sufficient to abut the physical elements properly. In other cases, and depending on the accuracy of alignment (for example, in other embodiments, the top-alignment indicator is joined by other directional alignment indicators to improve accuracy of alignment and power of proper alignment from slightly farther distances), a further move or offsetting may be required as well as brining the two elements even closer together whereby forming an actual abutted connection. The methodology of performing this task also varies depending on implementation techniques and state-of-the-art at the time of forming the technique. In an example a simplified method is providing attractor elements within each of the physical elements, or only in the detached or base unit of the complex physical element. In some cases it is preferable for the base to have the additional attractor capability as it is more likely to have access to a better source of power as well as ability to have circuitry controlling the on/off (enable/disable) of the additional attractor functionality.

In the final phase of performing the optional last step necessary for an automatic physical connection formation, an implementation-specific option comes in a form such as a magnetized chassis that upon abutment, comes out and provides the additional attraction force necessary to ensure a proper secure connection. The designation of attraction and repelling are options that can help enforce the connection phase for reducing the amount of power consumed and shortening the time elapsed to secure connection formed.

In case of a security latch being in operation after abutment, a smaller coded latch to chassis can provide this functionality. Upon a request for detachment, the opposite step of latch release can be performed using the same procedure in reverse. As an example the coding can include magnetized, electrically charged connecting elements at or near the latch open and close area.

Although much of the applications discussed herein may involve forming a secure electrical connection between two electronic components, the methodology and system equally apply to any two physical elements in need of forming a connection by coming together. The details of the implementation techniques will then be adjusted to apply to those cases and any future physical medium in need of forming such autonomous or automatic connections without user intervention.

Current physical connectors have a rigid and unchangeable design as well as provide no intelligence in and of themselves as to what the connector and its respective pins requirements are. An aspect of the present invention proposes adding intelligence to the connector itself whereby the connector is self-aware and as required has the ability in short and super-short ranges to broadcast or provide upon request, this information to specific other physical components authorized and desiring to connect with this connector and its respective physical element.

The resulting algorithm is exemplified in attached diagrams and can be operating in detached mode as depicted or in attached mode in the reverse order of exemplified diagrams. Once in detached mode, broadcasting and sensing are turned on to seek a mate for the connector. The parameters surrounding the range and duration of time for broadcasting and sensing can be predetermined, hardcoded in the design or variable either by software mechanisms or dynamically programmable or variable on the fly.

Upon sensing a mate, in one exemplified embodiment, the attract mode is immediately turned on and the phases of the connection mechanism of align, attract and connect commence. Once a connection mechanism scheme is executed, the elements will be in attached mode and the attract mode is turned off, the algorithm thus returning to detached mode and its respective activities as is exemplified in FIG. 3.

In order to perform the phases of the connection mechanism, some embodiments utilize the attract/repel forces of opposite/similar polarity or magnetic elements or magnetically charged physical element itself. In such cases, the turning on and off of the magnetic forces as the case may be can be controlled by purely hardware mechanisms as well as a combination of hardware and software controlled. In this case, sensing is followed by turning on magnets and completing the main phases of the connection scheme, then turning off of magnets before returning the connection algorithm to attached mode and so on.

Turning attractive force (such as magnetic force of magnetic elements) on and off can be done by various methods to make the attractive force inoperable by turning off the force or blocking via other neutral items.

As an example, using the magnetic force to align connectors near perfect can eliminate the need for physically snapping the two connectors together in some embodiments.

In these figures, an embodiment of the algorithm of the connection mechanism is outlined. In case of a base unit only sensing capability can be present while in two physical units coming together would turn on sensing and broadcasting their own presence and availability is depicted.

Figure 7A:
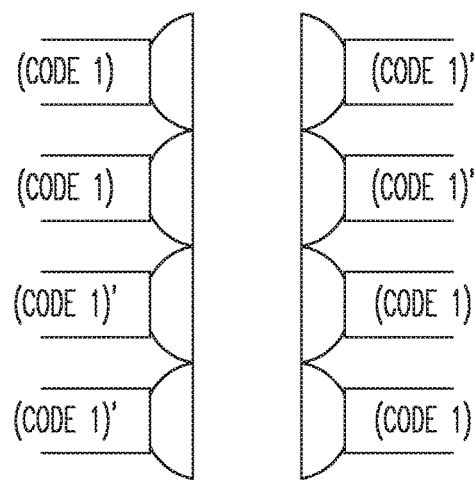
FIGS. 7A, 7B, and 7C show several block diagram representations of embodiments of connection points with oppositely (coded, charged, surface charged) polarities.
Figure 7B:
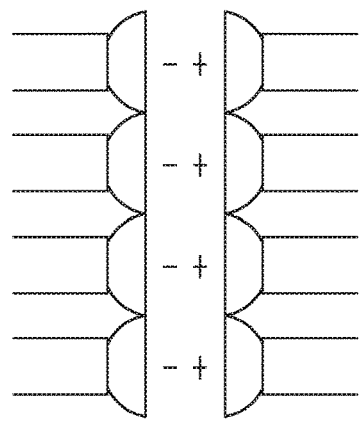
Figure 7C:
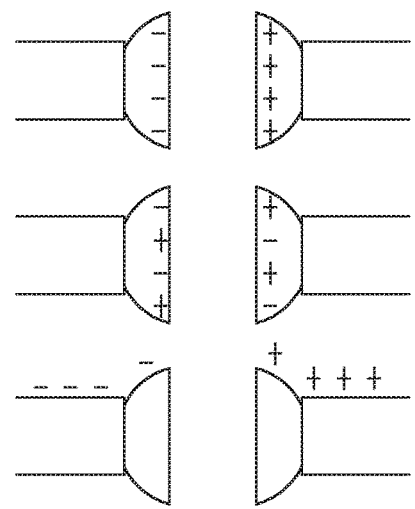
Figure 8A:
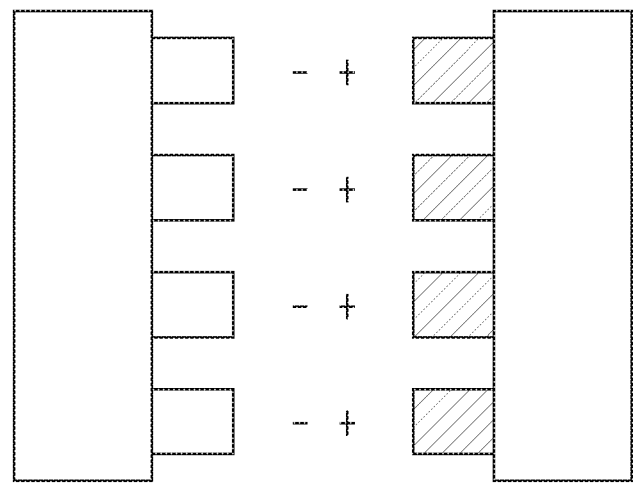
FIGS. 8A and 8B show block diagram representations of embodiments of connection points with oppositely charged and alternately charged pin-outs.
Figure 8B:
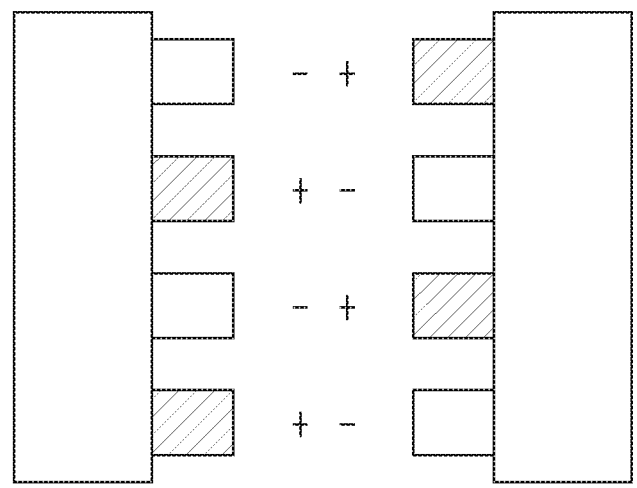

FIGS. 7A, 7B, 7C, 8A, and 8B demonstrate connection points with opposite polarity for attraction (and the reverse for repelling) at the pin to pin or connection point to connection point level, as well as coding/polarity introduced on the surface area or only top (or bottom) surface area of the connector. Connection point coding or polarities can be made uniform for an entire side of the connector or made to be alternating among the connection points within any given connector side. In some implementations, alternating such coding although more costly may enable arriving at a better secure connection as well as help in the aligning and abutting phases of the connection mechanism. Alternatively, once the secure connection is established, the coding or polarity may be removed from some or all of the pins, connection point or housing units. In some cases the connector grip itself and in other cases an additional latch ensures the connectors will stay in alignment for the operation of the device. In FIG. 7A connection points with oppositely coded pinout are shown. IN FIG. 7B, connection points with oppositely charged pinout are shown. In FIG. 7C, connection points with oppositely charged, alternating charged, on surface, and on housing are illustrated. In FIG. 8A, connection points with oppositely charged pinouts are shown. In FIG. 8B, connection points with alternating pinouts are shown.

Removing in this case may refer to removal of polarity or coding, or rendering it inoperable by means such as blocking by another neutral item.

Dynamically Programmable Coded Connector for Connecting Physical Elements

The innovations in this disclosure enable adding intelligence to the connecting mechanism of physical elements which is applicable to input/output circuitry and related mechanisms of electronic devices as well as ball, pin, packaging elements, internal, external, attached or detached mechanisms involved in bringing two physical elements together for the purpose of making a secure connection such as the case of forming a secure electromechanical connection among two detached modules or a module attaching to a base module. In an extension of these innovations, such methodologies may be employed to perform fast, secure and automated connections of chips or bare die connecting to other elements or the connecting mechanisms of printed circuit board or any such equivalent to its respective components as well as connecting one or more of those boards together. In these cases, the chips or other components to be connected can be using coded or coated connections and by placing them in a specific vicinity of a printed circuit board or other such connecting vehicle, they fall into their appropriate location without the need for human intervention in aligning, placing or soldering such connections, instead by automatic "align, abut, connect" procedure, even any required physical soldering or making connections permanent may be all automated without the possibility of human error or breakage due to variability of pressures applied.

Figure 9A:
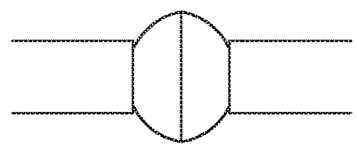
FIGS. 9A, 9B, 9C, and 9D show block diagram representations of embodiments of connection points abutting for properly coded and refusing or misaligned for similarly coded connection points.
Figure 9B:
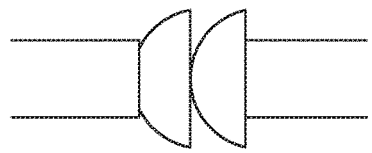
Figure 9C:
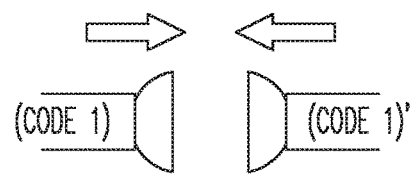
Figure 9D:
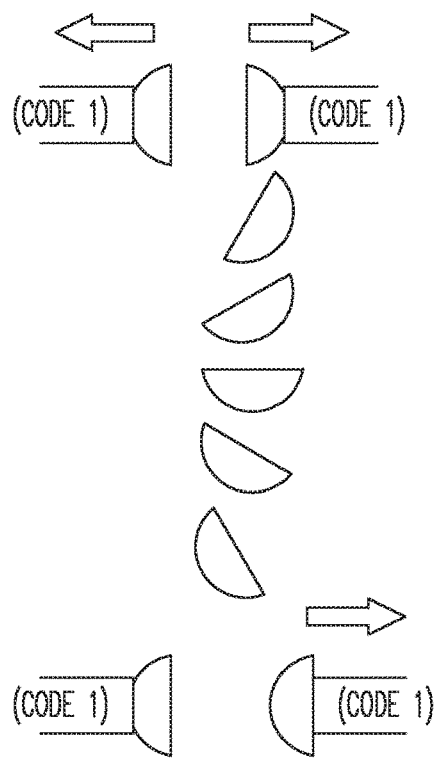

FIGS. 9A, 9B, 9C, and 9D depict two cases that demonstrate the ability to control and alter the physical connectivity by making connection mechanisms intelligent. In FIG. 9A, connection points abutting is shown. In FIG. 9B, connection points are misaligned. In FIG. 9C, connection points with opposite polarity is shown approaching: leading to connection accepted. In FIG. 9D, connection points with same polarity are illustrated as approaching, leading to connection being refused. In one case the respective connectors coming together or in the vicinity of each other are coded with opposite (attractor) codes. In this case, they will be attracted towards one another forming an aligned and abutted connection. In the other case, the respective pins in each other's vicinity are coded with similar polarities (repelling). As a result, a connector can be made to change shape on the fly, making at least one of the connectors misaligned so that the two pins will not be able to connect together even if the intelligent connection mechanism is somehow turned off. Furthermore, even after changing the connector shape or alignment, potentially making it a permanent misaligned connector, the similar coding of the connectors (repelling) will continue to move them apart. This aspect of the embodiment in changing the physical connector can be made of the fly and allow for checking and confirming security breach and in that case rendering the physical connector, hence the device bit-level communication capability at the physical level, inoperable.

The innovations discussed applied to point to point connectivity of physical elements make the process seamless, fast and intelligent.

Coded Connecting Lines and Self-Aware Pin Out

As described so far, these innovations allow for the connectivity itself to be self-aware. In this case, it is recognizing itself and its correct positioning, able to sense, group, align, orient itself as well as reject connectivity by repelling or changing its pin configuration or orientation on the fly prohibiting physical access in case of a security breach detection or notification.

Alternatively, the connection mechanism can perform the phases of align, abut, connect by hardware coding and attraction mechanism, by software alignment or by self-determined or predetermined alignment.

Due to additional intelligence in the connectivity scheme and the fact that it can be coded, it allows for changing the configuration as user's need or context or environment of devices involved change over time.

Coding can be done to signal attachment points, signal pins, balls, solder points, or to the housing or any facility that holds a signal or a group of signals together or at the demarcation point where signals are designated to be placed or connected to.

Coding can be in the form of a magnetic charge of N/S, an electronic charge of +/−, a color code of visually opposite or differing colors designated as opposites, or any additional digital or analog means of accompanying a given signal and designating an opposite to which it is to be attracted such as magnetic or electric charge or other coating or attractive and repelling materials, or visual or other detection mechanism such as color codes or rules based when a code is accompanying the signal end points and can be made permanent or dynamically changed.

Coding and the different criteria for making a secure connection such as alignment, abutment and connection phases as well as the criteria such as distance and time can be made programmable and software controlled as the intelligence addition to the connector is capable and is requested by the user of the system.

Additionally, the coding can remain present or it can be temporarily in place during the detection and attraction phase and once a secure connection is made, the coding can be withdrawn, replaced or off until the time for detachment.

During detachment the opposite steps of making a connection are performed where connection secure is replaced with connection release, all the way to attraction which can be replaced by repelling or blocked during the connection disengagement phase.

Coding can be made so that the power or intensity or distance or time of detection is minimized due to compounding of attractive-attractive forces by coding more than one set of pins with opposite codes creating a larger attractive force or by combining attractive-repel forces where one set of points like the top of the connector is moving due to attractive forces of opposite coding while the other set such as the bottom of the connector is adding to this rotation or force by being coded with similar codes hence repelling the wrong side for the alignment, providing a faster and more seamless alignment and connection process.

The present disclosure enables completely hands-free operation for connecting and disconnecting hardware components together. In one embodiment, the initiation of connection scheme is initiated not necessarily by sending and/or broadcasting of existing modules, but can be solely initiated by a voice command from an authorized user of the system. In this case while in detached mode in depicted figures, upon receiving a voice command, having been optionally activated as having the same voiceprint as an authorized user of the system, the algorithm immediately turns to the initiation phase of the connection mechanism (or disconnect as the case may be) without the need to go through the sense cycle. In this type of embodiment, a user calls for features that have physical or physical movement impacts, and after an optional voice recognition or other security measures that could include biometric, biological, visual or other audio or touch identifications, the connection mechanism performs that physical function, for an example, an audio command to release the camera module from a base module can perform this function automatically. In certain embodiments this module can be released to a predetermined set of coordinates, to a dynamically variable set of coordinates, to a dynamically calculated set of coordinates in a predetermined range guided by the voice command source, or guided to an opposite polarity or oppositely coded small connector, following the other procedures in this disclosure, while the small connector rests on the body of a user of the system for an example attached or embedded in a wristband that contains the guiding mechanism for the camera to reach users hands.

In another embodiment, the detachable module upon certain functional conditions can be detached. As an example, in a noisy environment where the ring or vibration of a phone cannot be distinguished from ambient noise, a detachable phone or headset modules of a base unit can be designed or programmed to, upon receiving a phone call or message to be automatically detached (connection/disconnection mechanism to initiate without sense/broadcast steps depicted in attached figures) and similar to as described previously have the detached module land in previously scheduled coordinated, calculate coordinates on the fly, follow a particular audio strength or visual icon direction or be guided toward an opposite polarity or oppositely coded connector resting on or around a user's ears, around the neck or any other wearable location. Some of these embodiments are depicted such as the case in FIG. 22.

Another embodiment of the present invention is connectors recognizing each other by visual recognition or sensing. This ranges from a basic visual characteristics check and/or sensing the dimensions or characteristic of the opposite connector by visual cues once the connector is placed in sense/broadcast mode either automatically as described earlier or by explicit information commands which can take the forms of audio voice, visual gesture, code and raw command bits transfer, touch or biological or biometric information sensing or any of the above combined to form a predetermined set of methodologies for sensing connector mates.

Figure 1:
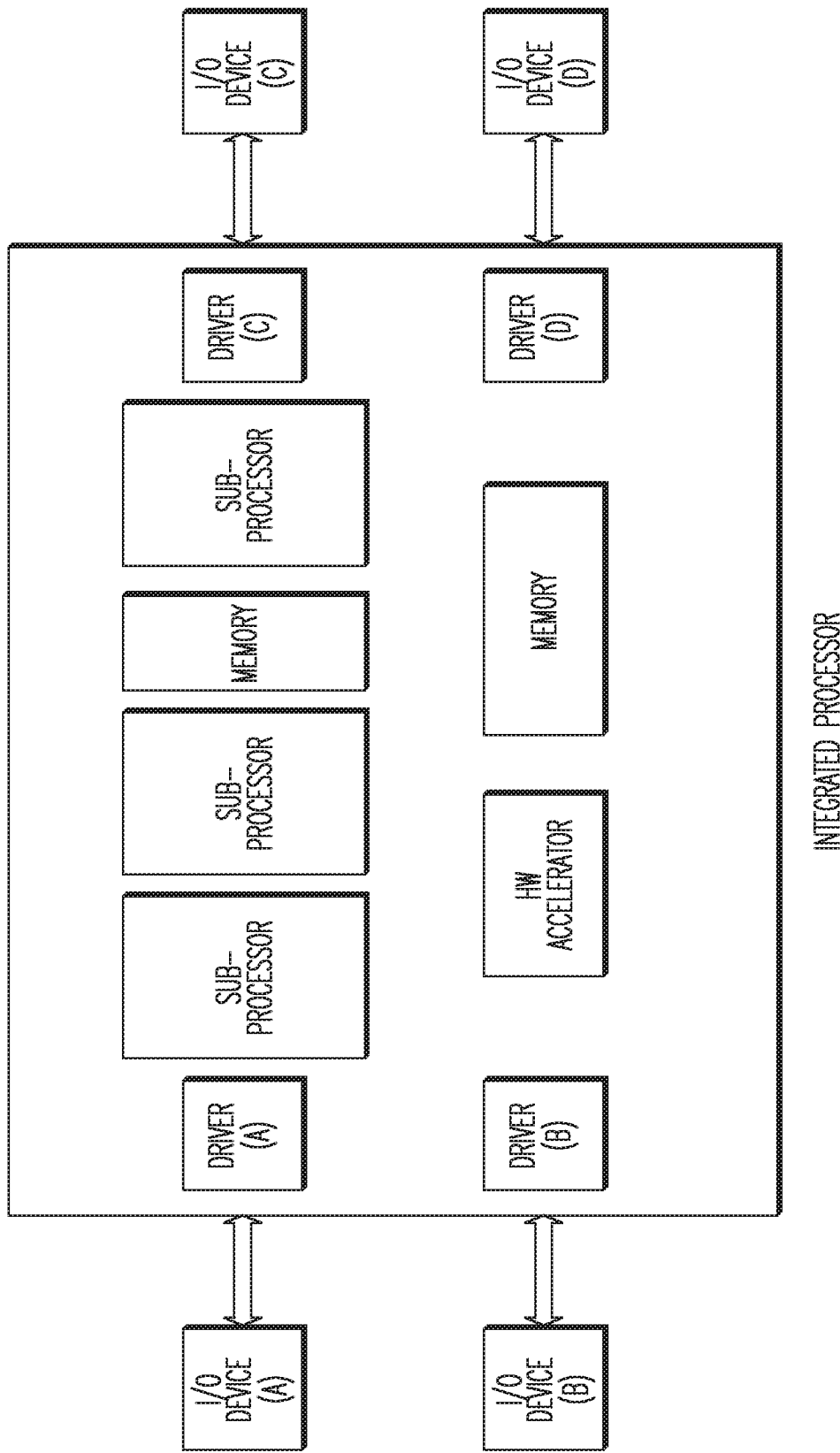
FIG. 1 is a block diagram of an integrated processor connected to multiple external I/O devices.

As an example, the system depicted in FIG. 1 is a typical integrated processor needing to interface with multiple I/O device components. These required connections may be at the chip to chip level or system to system level. Properly aligning, abutting and making a secure connection based on the techniques described earlier can make this happen automatically.

Figure 11:
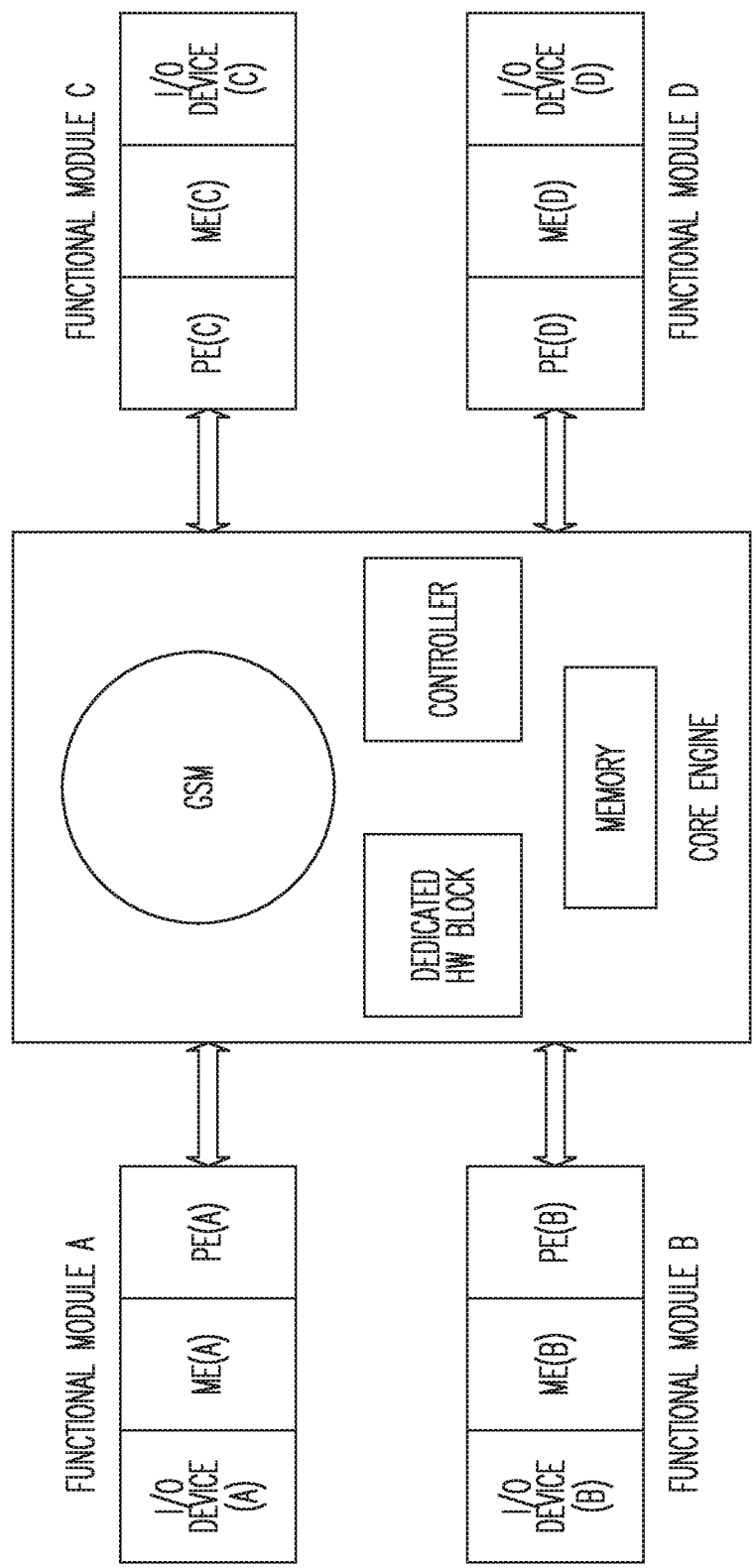
FIG. 11 is a block diagram of dedicated core engine connected to multiple functional modules.
Figure 12A:
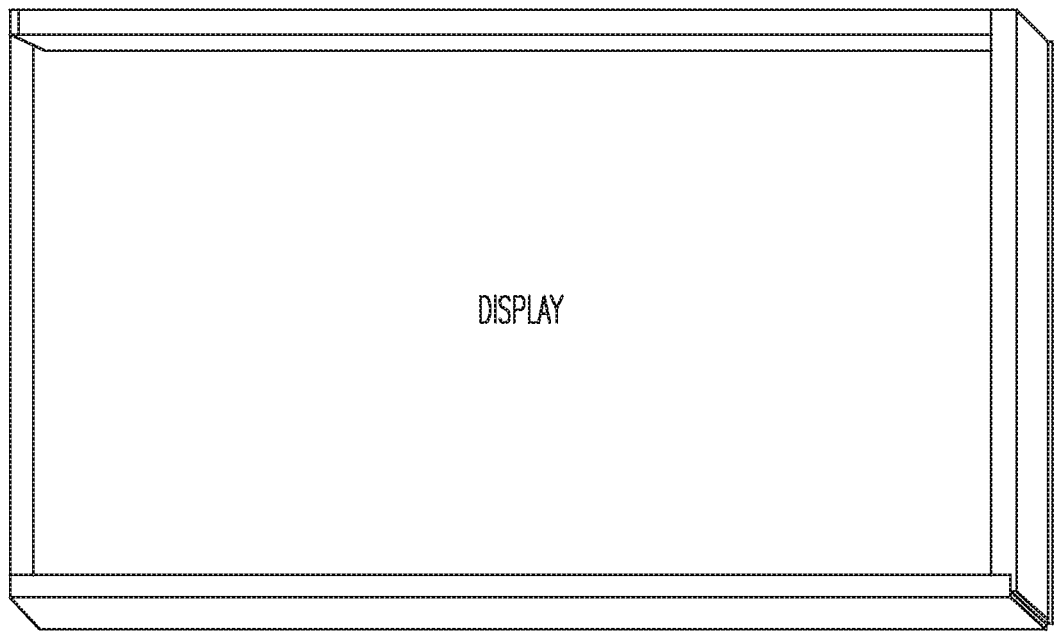
FIGS. 12A, 12B, and 12C are block diagrams depicting a detached display unit (12A), a modular mobile unit with intelligent connector technology (12B), device housing with potential surface coating/coding (12C).
Figure 12B:
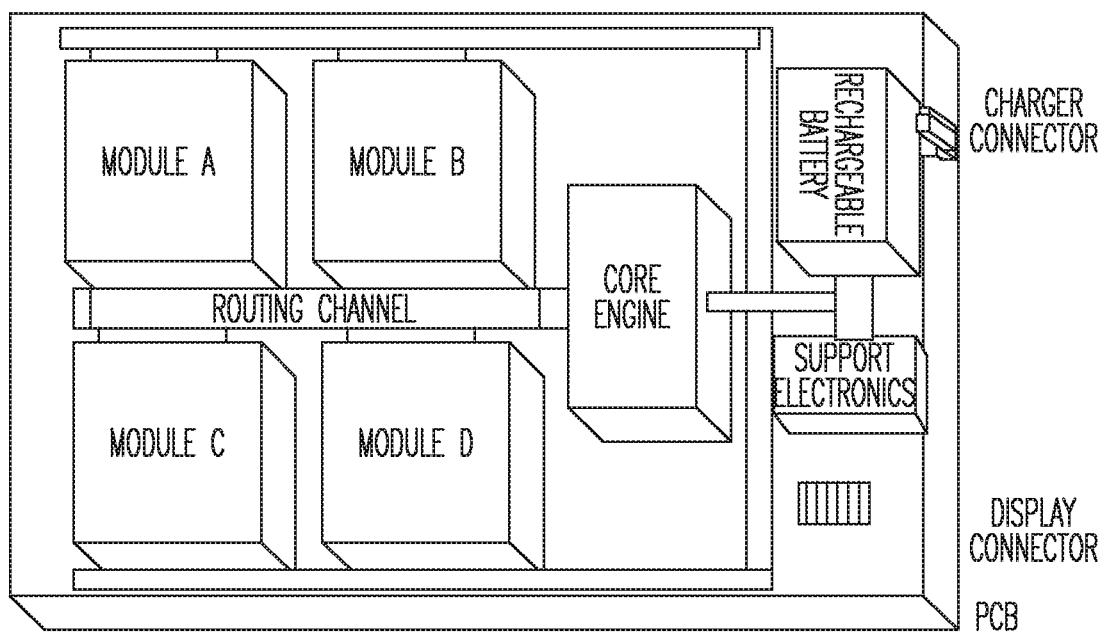
Figure 12C:
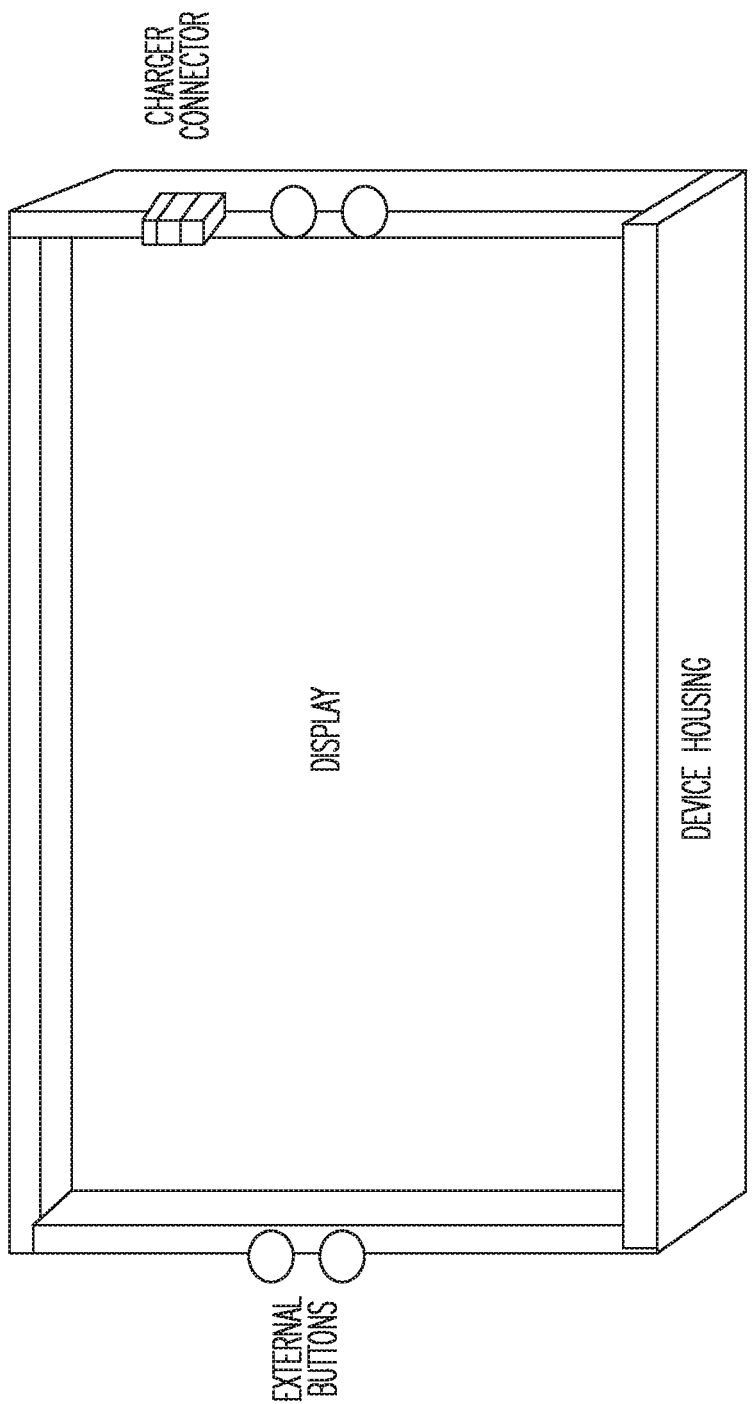
Figure 13A:
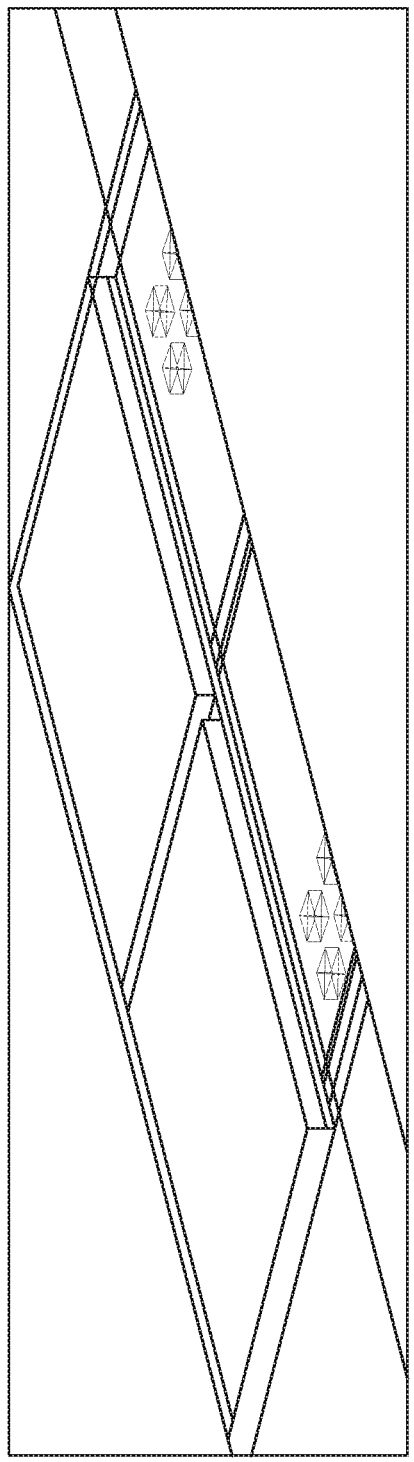
FIGS. 13A, 13B, and 13C are block diagrams of representative connector and module connectors in detached and attached modes.
Figure 13B:
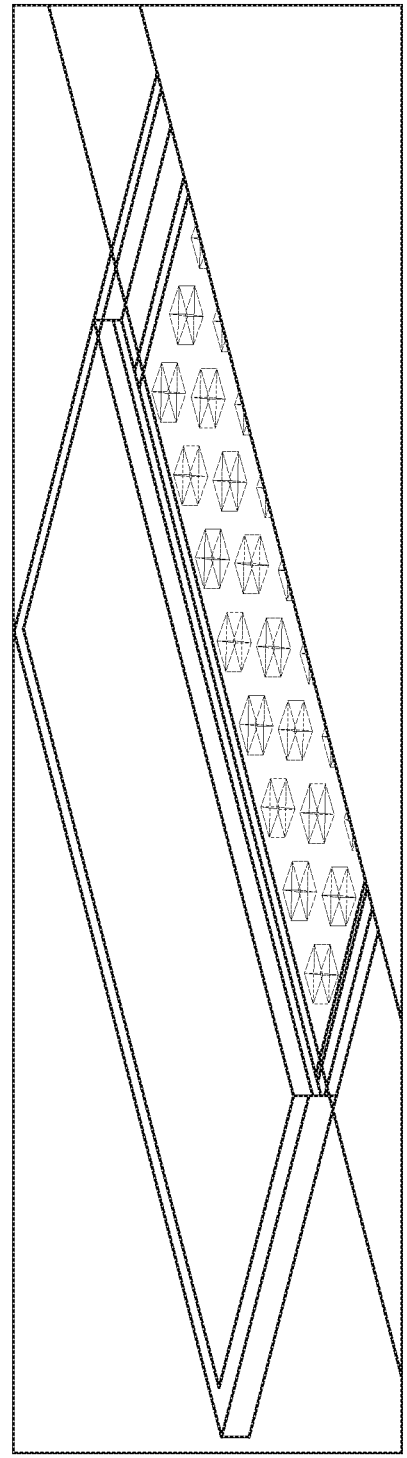
Figure 13C:
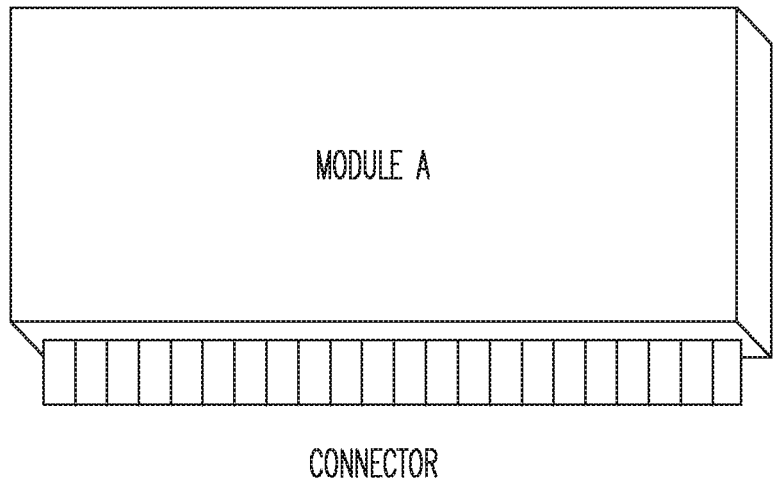
Figure 14A:
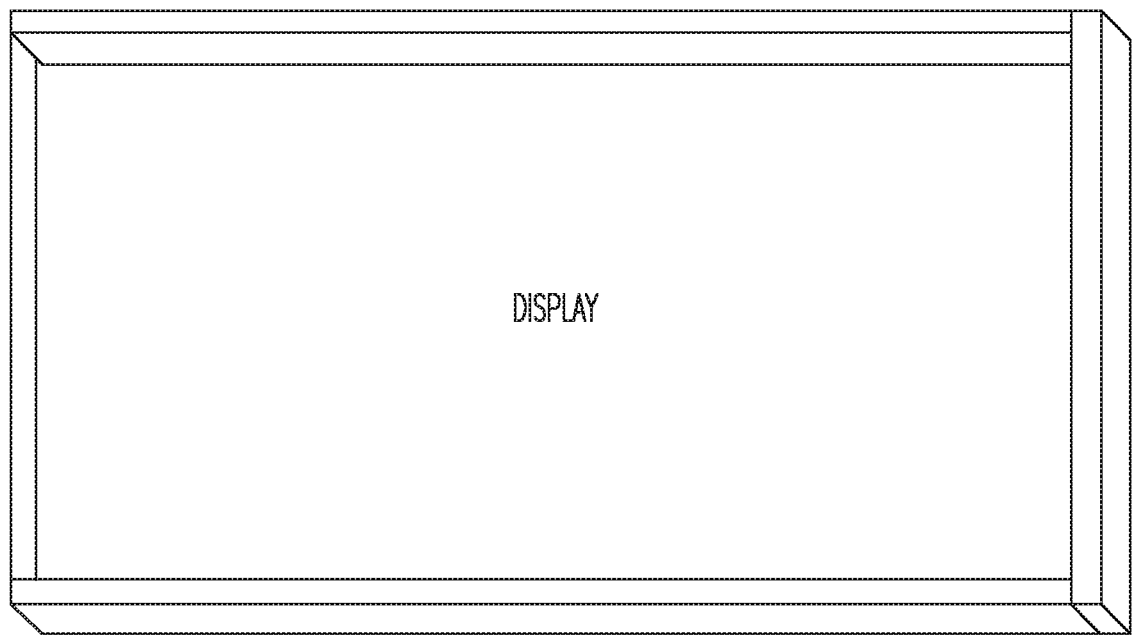
FIGS. 14A, 14B, and 14C are block diagrams depicting detached display with modular mobile units in attached mode to intelligent connector channel.
Figure 14B:
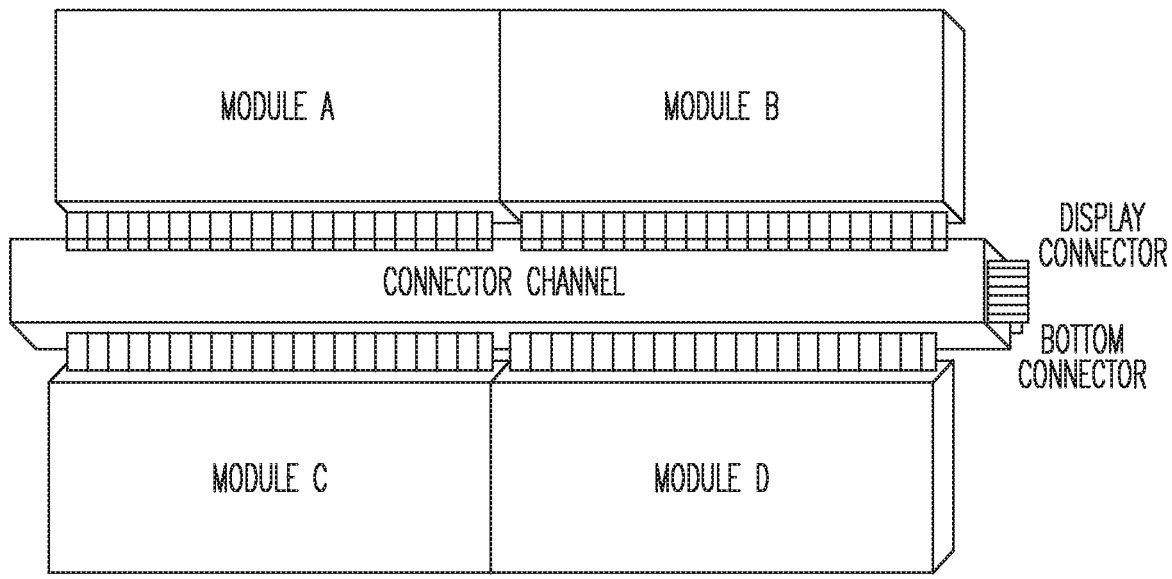
Figure 14C:
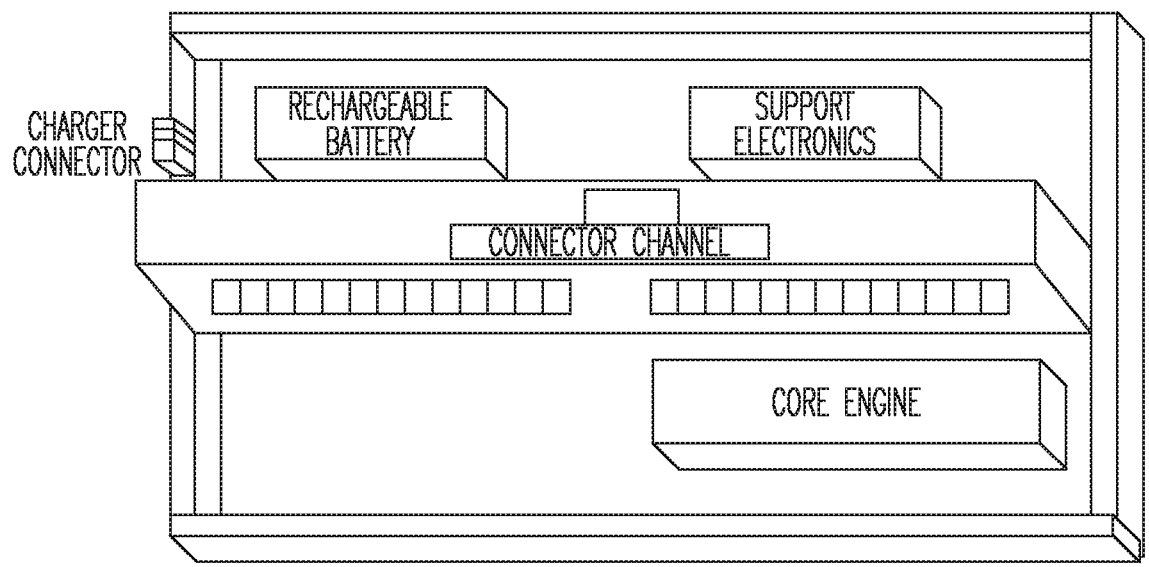

An embodiment of an application of the innovations presented here is further demonstrated by a modular and customizable mobile device depicted in FIG. 11. In this case, the system can take advantage of the intelligent connection mechanism with a general purpose connection type as well as in the case of a mobile device with a user-customizable physical form factor. The mobile device may be in the form of multi-function mobile electronic system with distributed memory and processing elements. Examples of such systems are depicted in FIG. 12. FIG. 13 demonstrates a module with a connector that can employ automatic connection capabilities and producing devices with customizable form factors on the fly automatically or without physical intervention by the user. In the case of a customizable device and/or customizable form factor, the ability to attach and detach from the main system chassis (housing) can happen at the manufacturing stage, assembly stage, post-packaging, or post-sale stage. The functionally distinct and optionally independently operable intelligent sub-systems together form a multi-functional mobile electronic system while sharing tag information with and/or through the master subsystem via shared connectors, with applicable control signals to enable such sharing an example of which is depicted in FIGS. 14A, 14B, and 14C. Shared connectors employing the intelligent connection mechanism described earlier enables modules automatically, aligning, abutting and connection, enables the appropriate modules to connect to their respective connectors, in case of specialized modular memories, the intelligent connector enables providing further security for the system as a whole by preventing the wrong modules to connect and in case of a data breach or security level elevation is able to disconnect portions of the connector affected by the security breach while leaving the rest of the system operational. In traditional connection schemes, once a connector is made standardized for example, multitudes of modules may be allowed connection through that connector without any intelligence regarding the actual modules involved and in absence of sophisticated algorithms theft or corruption of data is possible. In addition, even with security schemes post physical connection, once the connection is present, such soft security measures can be overcome by more advanced crypto techniques. In this case, the connection is refused so no real data bits can travel to unauthorized or to modules or connectors flagged as a security risk.

Another example is a mobile device with one or more detachable intelligent displays for communication to, and/or as access to, mobile device and/or other devices. Further, a mobile device can be shared through use of such intelligent detachable displays. Independently operational small module displays can be combined to form a large display for the mobile device. The mobile device may include, or have associated with it, a plurality of independently operable display devices, which are combinable to form a single larger display device for the mobile device.

The operation of connecting different subsystems or modules together or to a base unit as well as connecting any detachable displays, other audio/visual subsystems such as camera module, GPS module, or the camera lens module can be made seamless by implementing the intelligent connection mechanism in the present disclosure.

The mobile device architecture in this example can integrate various electronic modules into a single customized device. The Modularized Mobile Architecture allows for customization of device functionality based on user preferences. This customization can occur at any of several levels:

1. The modularized architecture can be applied to the design of the mobile device at the chip level. Each functional block is optimized and the chosen modules are all implemented on one chip. This allows for customization at the chip level and results in highest performance but least flexibility.

2. The choice of modules can be made at the package level, where selected functional modules fabricated on small micro-boards are assembled to produce the device. Alternatively, advanced packaging techniques are used to integrate each functional module on a single package (e.g. multi-chip-module, ball-grid-array (BGA) package, etc.). Selected functional modules are assembled to build the customized mobile device. This level of customization is done at the factory and offers customization to the user without significantly altering the manufacturing process. In this implementation, the device is customizable by the user at purchase order time and the modularity of the design is exploited at the factory to provide the user the customized solution desired; however, the device is not physically detachable by the user, so its flexibility is limited since the user cannot reconfigure the device after delivery.

In this case, the automatic attract, abut and connect phases of the intelligent connection scheme as described earlier can be employed for a series of modules to be connected on a printed circuit board, a micro-board or the like, allowing the modules to fall into and placed in their designated areas without factory worker's physical intervention.

3. The third method of delivering customization is the most flexible. In this approach, the functional modules and the mobile device core housing are delivered to the user and the user can attach or detach some of the modules at the point of use. This allows for the customization to occur both at the functional level as well as the physical level and offers the most flexible option.

In this case, the automatic attract, abut and connect phases of the intelligent connection scheme as described earlier can be employed in the set up phase of the customized system as well as in everyday use cases where the user in their need to use different parts of the system without physically attaching or detaching but by using voice or gesture commands or by dynamically engaging and disengaging the connection mechanism.

Figure 15A:
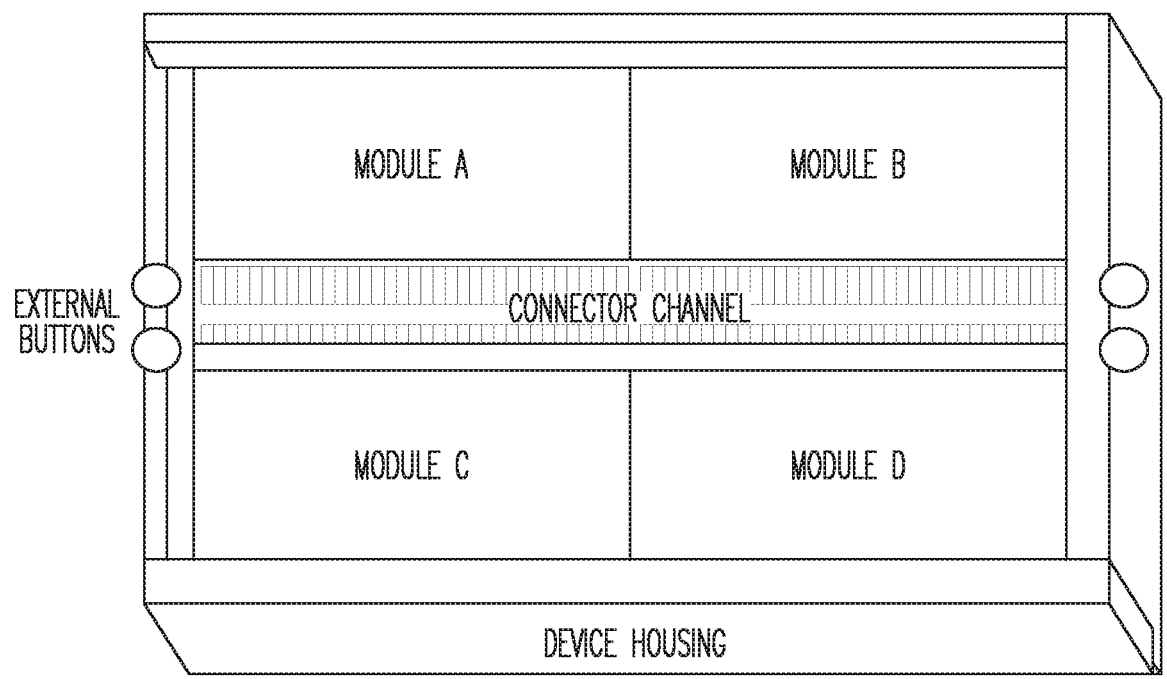
FIGS. 15A and 15B are block diagrams depicting intelligent connector and modules in attached mode together inside an optional coded/coated housing unit with an attached mode display on the opposite side.
Figure 15B:
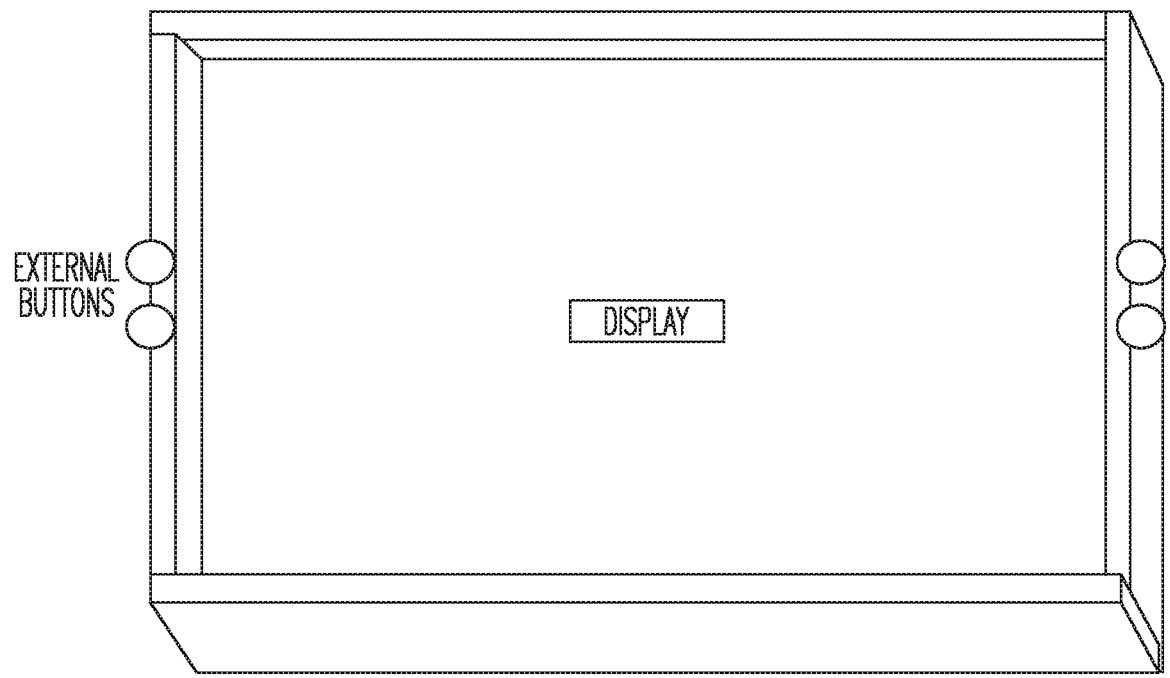

FIG. 14 shows an embodiment of a customized mobile device, which has detachable functional modules. In this embodiment, the functional modules do not have individual displays. Four modules are connected to the device through the connector channel placed at the center of the device. FIG. 14B shows multiple detachable functional modules connected to a connector channel. The core engine is placed on a micro board at the bottom of the device and is connected to the modules through the connector at the bottom of the connection channel. FIG. 14C shows a core engine which controls the interactions among the modules and coordinates the operation of the system and other components of the mobile device connected to a circuit board. The modules, connector channel, and micro board are housed inside the mobile device housing. An LCD display is placed on top of the device. FIG. 14A shows a display device that may be used in conjunction with the functional modules in FIG. 14B. FIG. 15A shows the functional modules and connector channel of FIG. 14B mounted within the device housing. FIG. 15B shows an example of an external view of the assembled mobile device.

FIG. 16 shows another embodiment of the customized mobile device with detachable components. In this embodiment, each of the functional modules has its own individual display device. The modules, using the connection mechanism described automatically slip into the mobile device housing and connect to the connection channel as described above. On top of the mobile device, there is an opening in the top surface of the housing for the display units. These modules are independently operable and each module uses its own small display in the stand-alone mode of operation. The core engine keeps track of the modules that are connected and sends the appropriate control signals to the circuitry for resizing the image appropriately. Once the modules are connected to the mobile device, the core engine recognizes the individual display units that are connected to the device and resizes the screen so the mobile device has a single large display. The connection between the housing, connector channel and individual displays as well as the individual display coming together to form the larger display utilize the connection mechanism described earlier to form a seamless and automatic as well as a secure connection while attached as well as a seamless detaching operation for the various modules of the mobile system.

In this case the housing or the surfaces of the connection channel may be coded, coated, charged or magnetized appropriately enabling automatic connection mechanism to perform immediate attach or detach functions such as required upon certain conditions including but not limited to phone module ringing, etc. or upon user voice or visual command.

Figure 16A:
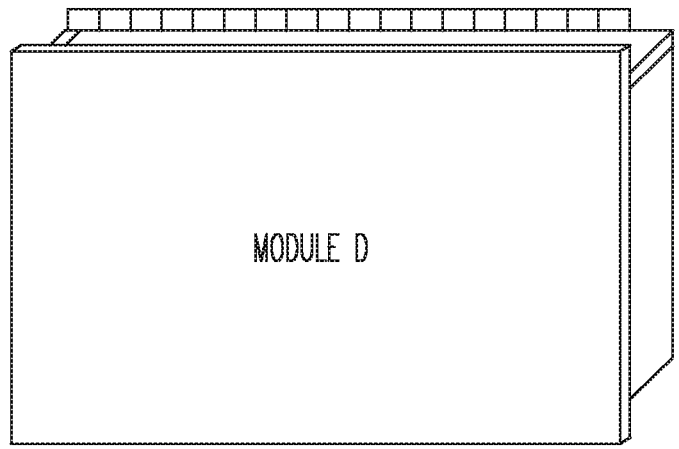
FIGS. 16A, 16B, and 16C are block diagrams depicting modular display and mobile units in attached and detached mode. Together forming a larger unit.
Figure 16B:
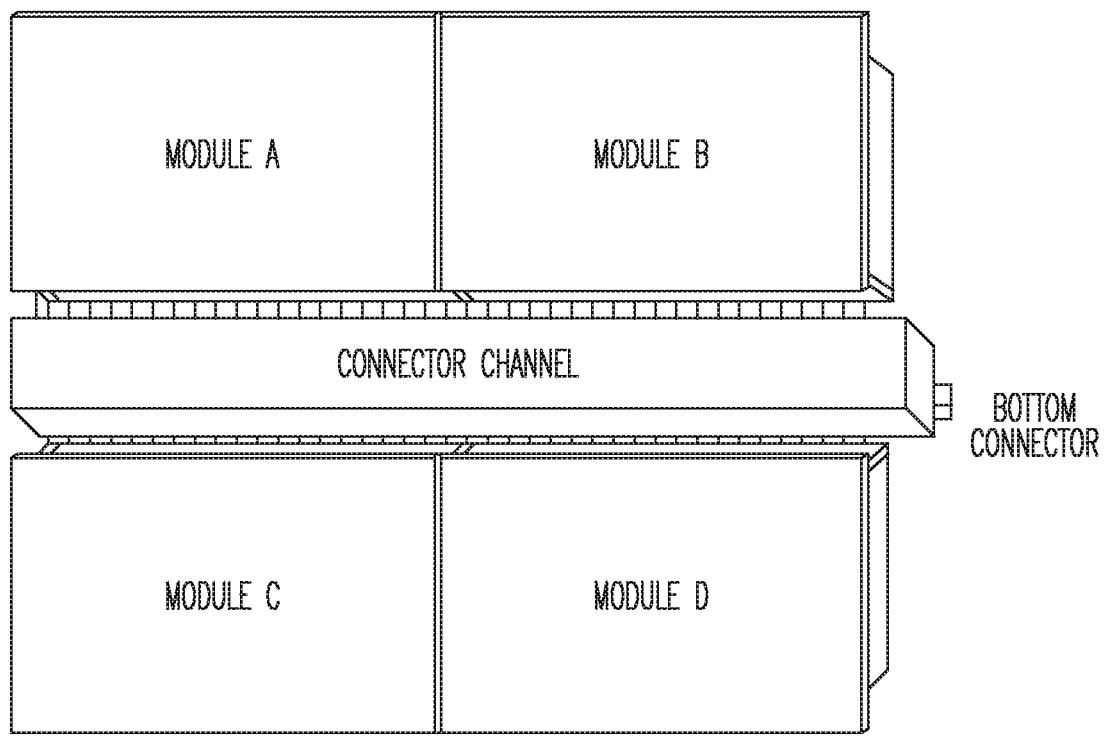
Figure 16C:
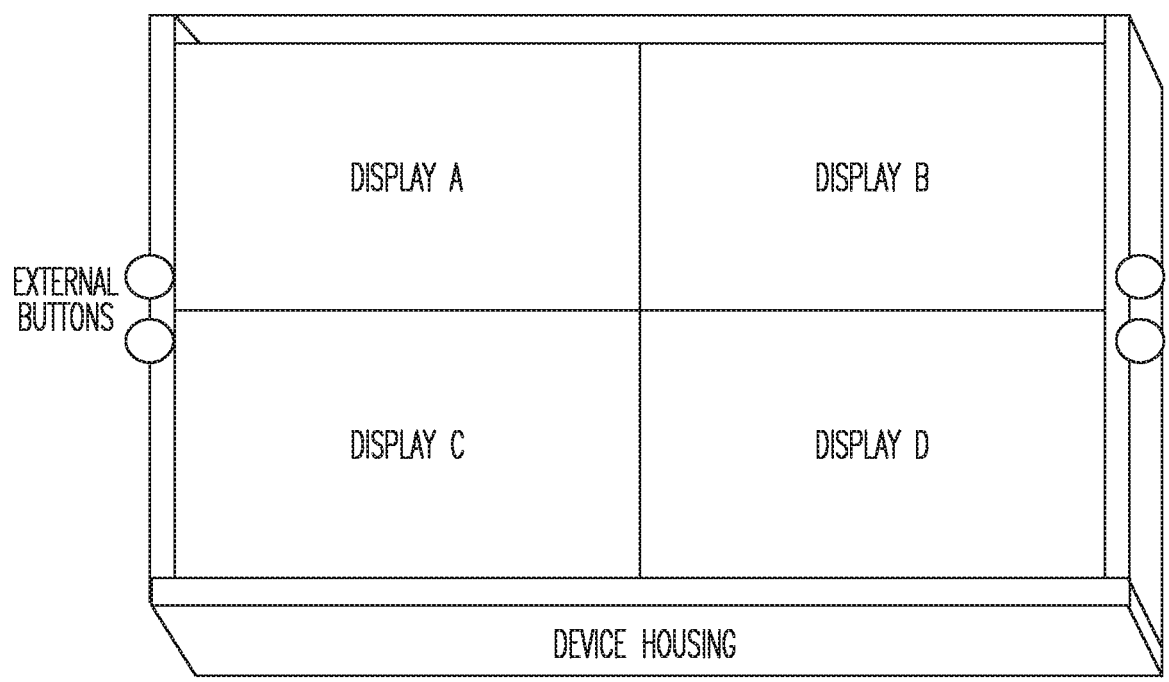

FIG. 16A shows a detachable, independently-operable functional module with its own display. FIG. 16B shows multiple functional modules such as shown in FIG. 16A, connected to a connector channel. FIG. 16C shows an example of an exterior view of the mobile device which has multiple functional modules such as shown in FIG. 16A, where the individual display devices of the functional modules collectively can be operated as a single larger display.

While many detachable modules can be independently operable, that is not a requirement. For example, a single memory or display module may not be operable on its own, and there are modules that are supporting accessory hardware for another module. A "super module" can incorporate a number of module functions that are commonly used together. Connecting such "super module" elements together can be performed automatically using the intelligent connection mechanism outlined earlier.

Modules in detached mode which are connected to a communications module can be reconfigured over-the-air to support an array of functions in the stand-alone mode. This can be achieved through the use of field programmable logic as well as registers which can be updated remotely to allow for modified mode of operation of the module in a power efficient manner.

Similarly, the dynamic nature of the connection mechanism can be achieved through embedding programmable logic, processing elements, memory elements, appropriate registers or combinations of these as well as sense and broadcast circuitry in the connecting channel itself, in a connection module attached to the channel, in one or more of the modules in the core engine coordinating the operation of the mobile device or any such combination depending on implementation specific requirements.

Figure 17A:
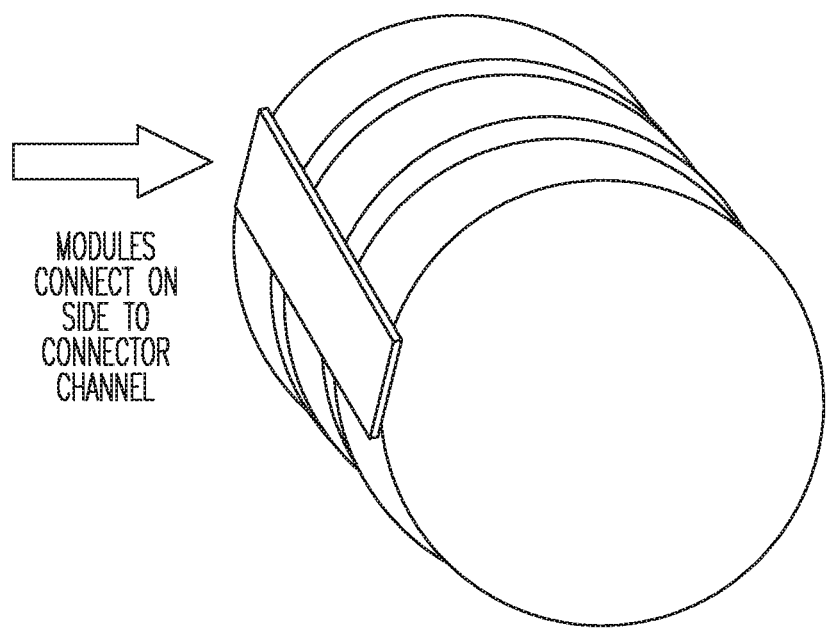
FIGS. 17A and 17B are block diagram representations of a radial module configuration device with a central core and housing for additional modules around the core.
Figure 17B:
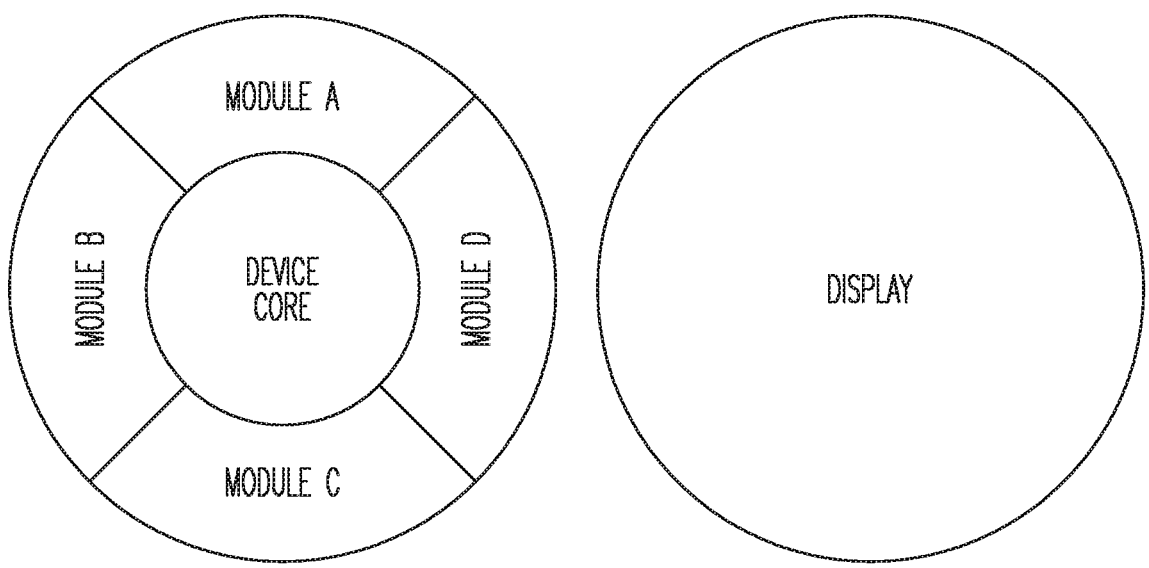

In an alternate embodiment, the connector channel performs the same functionality by connecting an alternate form factor such as the radial/circular modular design as depicted in FIG. 17.

In one embodiment, the mobile device has a very small display or no display at all. This is the normal mode of operation, generally the mobile mode of operation. As a result, the mobile device is small and has low power dissipation. A group of larger displays are designed and made available to the user upon request. These displays vary in features such as size and display resolution. The initial display design can be the size of a business card to be carried in a wallet and used in a similar manner. This display size is adequate for a large number of users in a mobile environment. This detached display can be attachable to the mobile device via direct wire connection or via wireless link.

Figure 18:
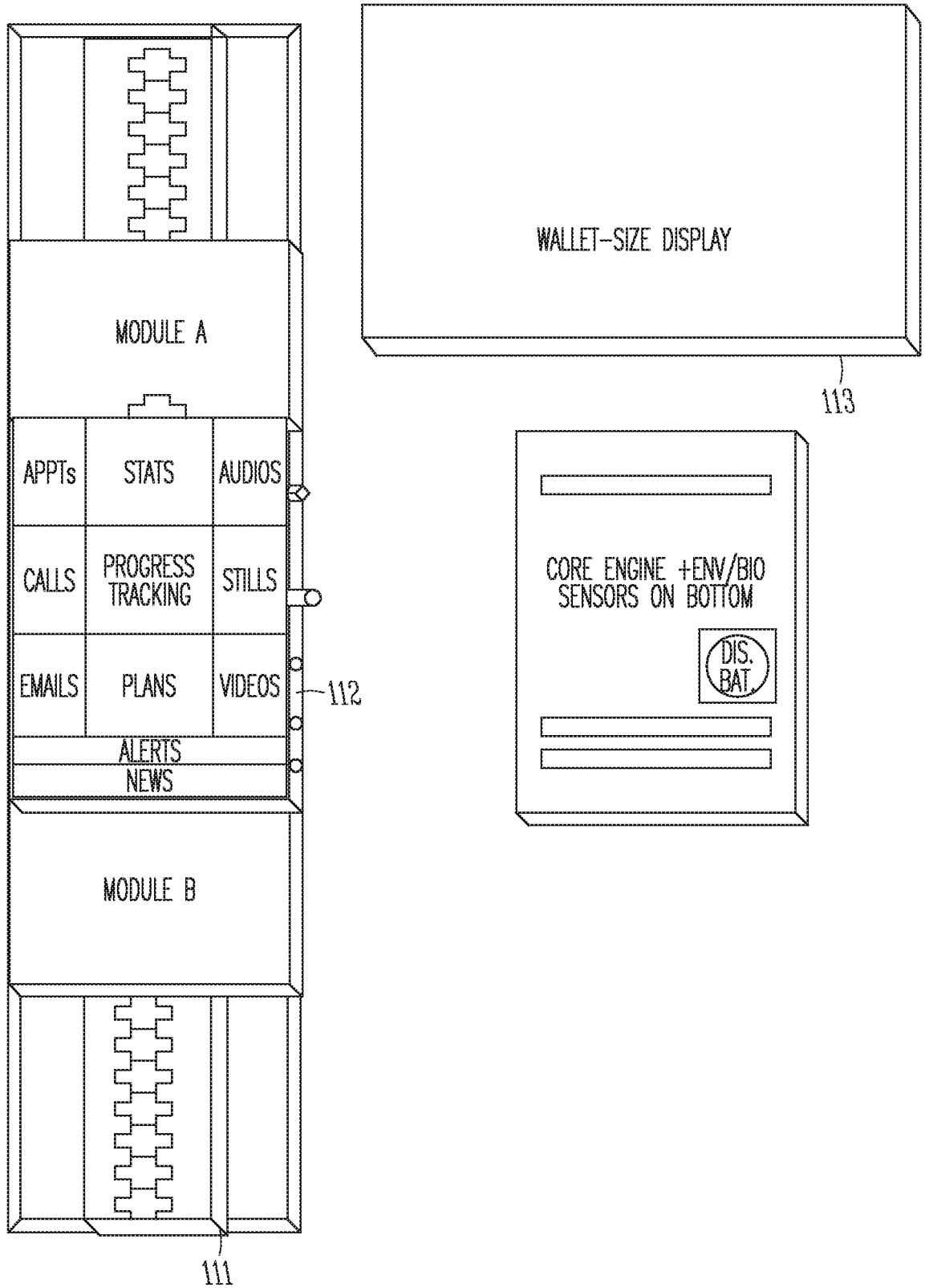
FIG. 18 includes block diagrams depicting a modular mobile unit in a wrist-top configuration with attached and detached display units, wrist-top acting as a smart connection/housing for mobile system.

FIG. 18 shows a wrist-top mobile device 112 with an additional detached wallet-sized display unit 113. The core engine plus environmental sensors and/or biosensors are located on the bottom of the mobile device.

In the wireless mode, the display is turned on and is held by the user for viewing, totally detached from the unit. The mobile unit stays nearby, for example in a pocket, purse, or worn on the wrist. The user only holds up the display, which is smaller and less bulky, while having access to all the functionality of the mobile device. Once the need for detachability is no longer there, automatic or command-based attract mode of the intelligent connection mechanism brings the module in to connect to the mobile unit.

The intelligence in the connection mechanism can also be employed in locating and retrieving different subsystems in detached mode or be made to raise an alert if a specific detached module moves away from the intended counterpart modules by more than a predetermined distance.

Figure 19:
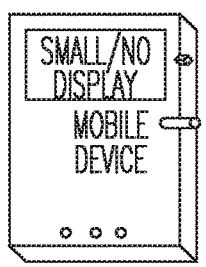
FIG. 19 includes block diagrams depicting a number of attached and detached units with intelligent connector technology embedded in a wrist-top configuration.
Figure 19:
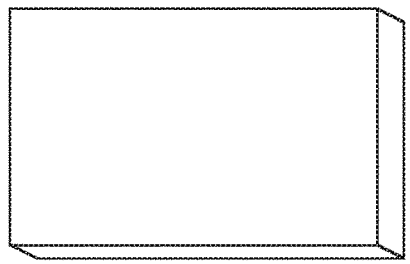
Figure 19:
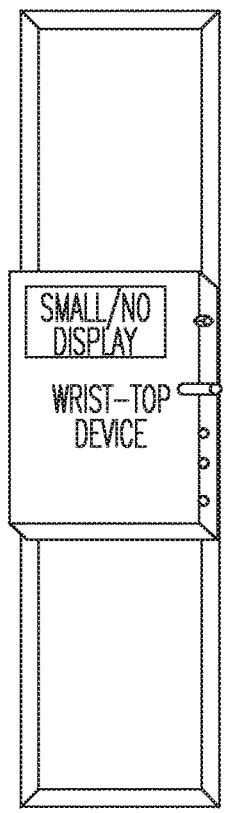
Figure 19:
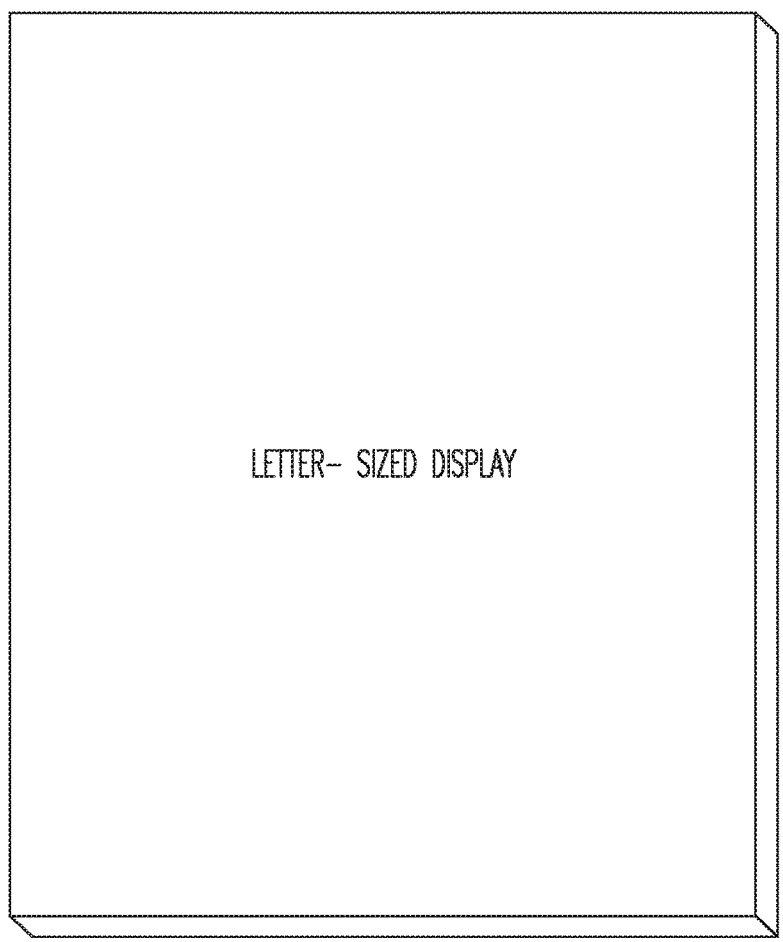
Figure 19:
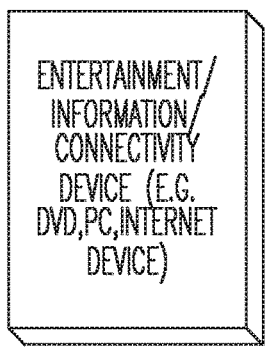
Figure 20:
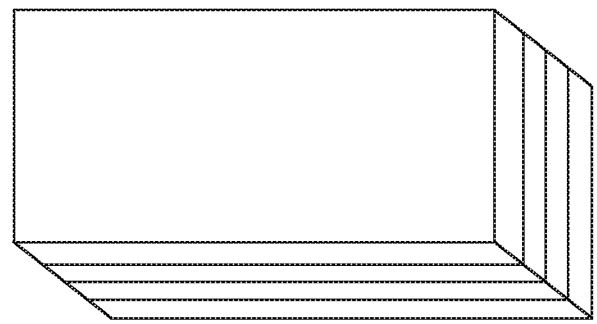
FIG. 20 is a block flow diagram illustrating use of intelligent connector technology in folded, open and stacked configuration of a display module.
Figure 20:
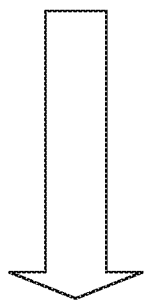
Figure 20:
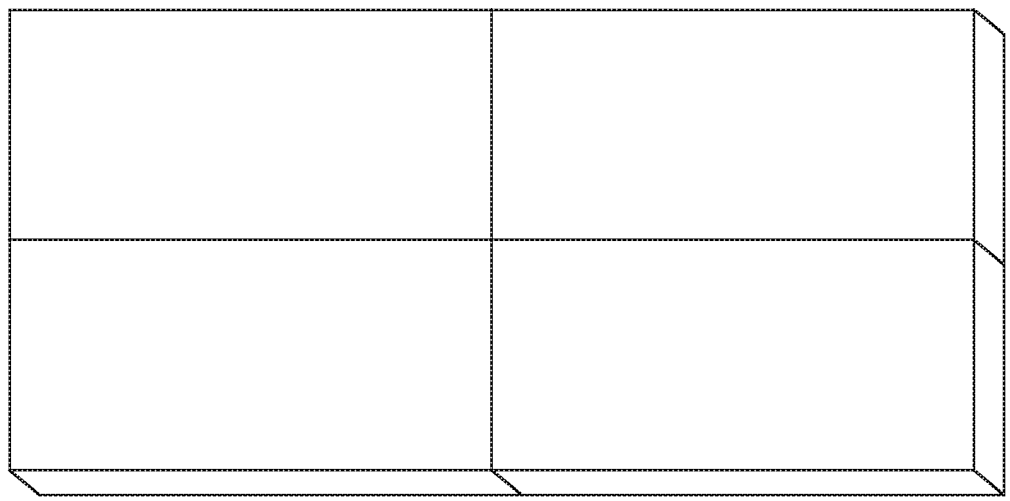
Figure 21:
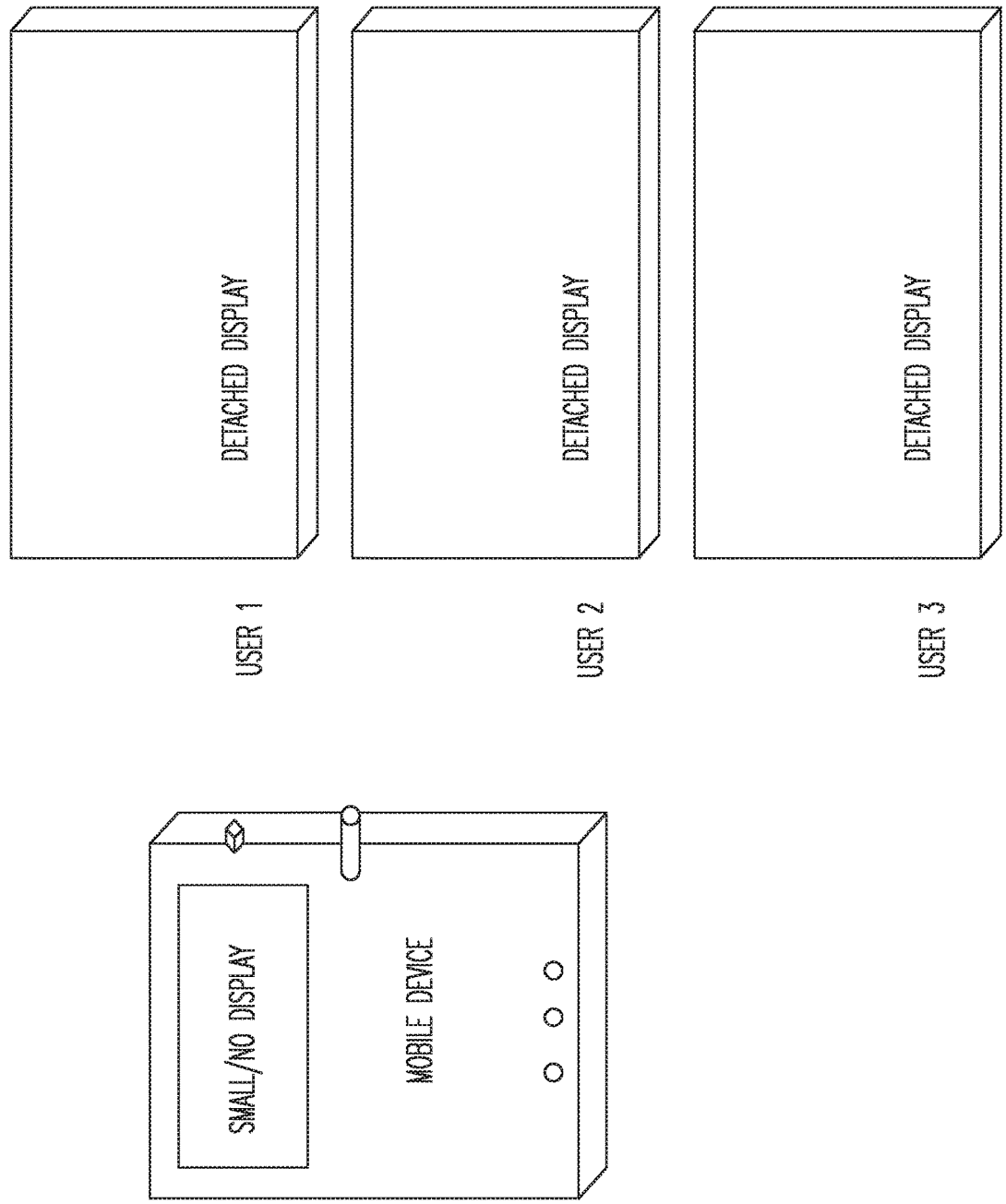
FIG. 21 includes block diagrams illustrating a mobile device with multiple detached display units utilizing intelligent connector technology in attached mode.

The detached display allows for a new usage model for sharing of information/shared viewing of content. Multiple display units can be provided to users so they can access the information/content on a single device. Security measures can allow for authentication of the display units which can connect to the device. In addition to point-to-point connectivity, multi-cast connectivity can allow users to access the information on the device. The system allows for the individual display units to act as separate application windows on the mobile device (with proper security features which control guest access). As a result, each display unit can allow the user to independently access authorized services, such as web access, etc. This allows multiple users connectivity and content access without the need for individual devices. This technology provides a robust solution to applications such as multiplayer gaming, presentations, and classroom/conference settings/on-the spot access to mobile services, etc. FIG. 19 shows an embodiment with optional larger display with can be detached from the main unit as well as other detachable modules. A mobile/wrist-top/Ent./Info./Connectivity device with detached display unit is shown. FIGS. 20 and 21 depict the above mentioned use cases in such detachable modules and stackable display constructions, in which case the connection mechanism can be used in attract/repel mode on the connector side itself or on the surface of the specific module. A mobile device with additional detached display units for multiple users is depicted.

In some embodiments, the system can have distinct and in some cases detachable, removable, expandable memory units, each storing items such as data, music, still photo or video.

While each detachable memory element can be designated for a specific application or type of data or specific module, a visual or voice command calling for such attachment or detachment via the intelligent connection mechanism, enables remote operation of the system while preserving and enhancing security and integrity of data components being the most sensitive and valuable part of any system.

As an example, upon a certain event causing a rise in security level for the system, attach/detach mechanism of the intelligent connection mechanism gets locked preventing theft or unauthorized attachment to an undesirable module on a temporary basis by locking or permanently by altering or destroying the physical connection itself.

Figure 22:
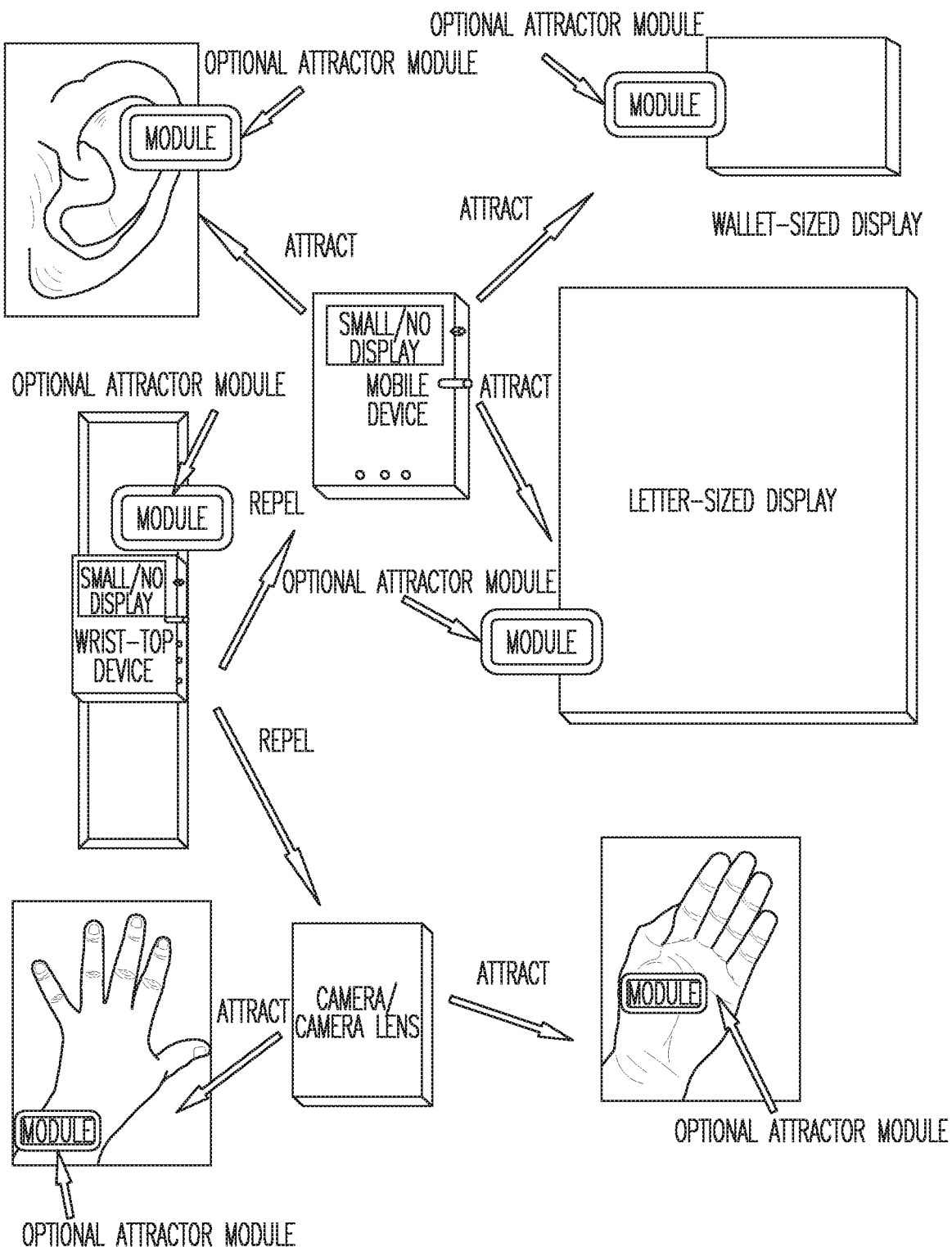
FIG. 22 is a block diagram illustrating detached mobile units being attracted to specific physical locations or specific body locations based on attractor sensor, coordinates or visual or audio location lock.

FIG. 22 depicts a culmination of some of the use cases for the intelligent connection mechanism. The main mobile device may initially be attracted to the wrist-top configuration, the device itself or a module within or attached to the device can be repelled from the wrist-top and attracted to the palm or repelled from a standalone mobile device and attracted to the wrist, depending on the availability and placement of a connector/sensor in the form of a module allowing for the attract/repel mechanism to work from a directional point of view, or based on coordinate scheme, programming the specific module to land in specific coordinates upon engagement of the intelligent connection mechanism, or upon a visual or auditory guiding scheme, the connector guiding the detached unit to the location of audio or visual command. The unit labeled module can entail part or all of attract/repel mechanism as well as the optional sense/broadcast module as described earlier in this disclosure. The functionality described for this module can partially or wholly be performed embedded in the mobile unit itself or as a separate attached or detached module guiding the other detached modules. The engagement and disengagement of the attract/repel or the entire connection mechanism can be performed by touch of a button on the module or device itself, remotely programmed, upon a specific event regarding that unit itself, or even upon certain scheduled time or upon receiving a signal through a network, or by the sense, broadcast, request to connect scheme described in the intelligent connection scheme algorithms described earlier.

The techniques presently introduced include but are not limited to:

(1) Intelligent connection mechanism
(2) Intelligent I/O pins, optionally software as well as hardware controlled
(3) Self-aware connector
(4) Mutually recognizing connectors
(5) Auto: sense and broadcast presence and location
(6) Auto: sense and broadcast request to connect
(7) Auto Connection mechanism: align, abut, connect
(8) Auto Connect by holding close for a duration of time
(9) Auto Connect instantly by holding closer
(10) Coded pins and coded connectors for a variety of opposite and coded polarity schemes
(11) Voice or visual recognition for audio/visual initiation of connection mechanism
(12) Auto: refusal to connect and provide physical connection security
(13) Dynamically changing connector
(14) Dynamically modified physical characteristic of the connector
(15) Magnetized connector mechanism
(16) Electrically charged connectors in solid, fluid or gaseous media
(17) Raise an alert upon subsystem moving away from base or another subsystem more than a predetermined distance
(18) Locate parts of a system in the form of detached module via connection mechanism
(19) Distinguish different detached memory units by connection acceptance or refusal
(20) Connection locking or destroying mechanism upon upgraded security level
(21) Connection-seeking connector
(22) self-orienting connector

EXAMPLES

1. An intelligent connection method comprising:
    establishing an attraction force among two components, wherein, the first component, is configured to align its orientation with respect to the second component, abut its connection points or pins to those connection points or pins of the second component, form a secure physical connection among the first and the second components via automatically connecting, snapping or securing together the first component and the second component;
    wherein said attraction commences upon:
        receiving of an attract signal by the first component from the second component;
        generating of an attract signal by the first component;
        receiving an attract signal by the first component from another component or a network or a combination thereof; and
    wherein said attraction force is established in an autonomous manner.
2. The method of example 1 wherein one or more of said components is a stand-alone connector component, a device having a discrete and attached connector component or a device having an integrated connector component.
3. The method of any of examples 1-2 wherein said attract signal is generated by detecting a matching connector within a pre-determined distance.
4. The method of example 3 wherein specified distance is dynamically variable.
5. The method of any of examples 1-4 wherein said attract signal is generated by detecting a matching connector within a pre-determined distance for a duration exceeding a pre-determined time duration.
6. The method of example 5 wherein said specified time duration is dynamically variable.
7. The method of any of examples 1-6 wherein said physical connection is performed in an automated way, enabling hands-free operation for connect and disconnect operations.
8. The method of any of examples 1-7 wherein said attraction force is generated in both of said components forming cooperative attractive force.
9. The method of any of examples 1-8 wherein the connectors and pins are coded.
10. The method of any of examples 1-9 and further comprising performing voice recognition and generating the attract signal responsive to a voice being recognized.
11. The method of any of examples 1-10 and further comprising performing a visual recognition of a connector and generating the attract signal responsive to the visual recognition.
12. An intelligent connection system, the system comprising a first component configured to gather or receive a visual, sensory or component identification information of a second component, perform verification of a possible match of the said second component information, and upon said verification, commence forming an autonomous connection and forming a secure physical connection among said two components without human intervention, enabling a hands-free connection mechanism, wherein said matching is performed using said visual, sensory or look-up of component identification information locally or on a network.
13. The system of example 12, and further comprising the second component, wherein the first and second components are configured to perform said autonomous connection by establishing an attraction force among two components, wherein, the first component aligns its orientation with respect to the second component, the first component abuts its connection points or pins to those connection points or pins of the second component, forming a secure physical connection among the first and the second components, wherein said attraction commences upon receiving of an attract signal by the first component from the second component, generation of an attract signal by the first component or receiving an attract signal by the first component from another component or a network.

14. The system of example 13, further comprising, detecting a secure physical connection is completed and ceasing generation of the attract signal.

15. The system of any of examples 12-14 wherein one or more of said connector is a stand-alone connector component, a device having a discrete and attached connector component or a device having an integrated connector component.

16. An intelligent connection method comprising:
broadcasting, via a first component connector, connector identification or device identification information, receiving or capturing, via a second component connector, said broadcast information, performing a connection matching, and upon verifying a match with the first connector, initiating an automated connection procedure among first and second component connectors, establishing a physical connection between said two component connectors, wherein said broadcasting or receiving of connector or device identification is periodic, confined to a short broadcast distance, upon receiving an identification broadcast request or a combination thereof, wherein said automated connection procedure includes detecting the location of said connectors, aligning, abutting and forming a secure physical connection among the two connectors by turning on attractive force among said connectors.

17. The method of example 16 wherein said connection matching is performed via sensing, a local look-up table, a network look-up table or a combination thereof.

18. The method of any of examples 16-17, further comprising, detecting a secure physical connection is completed and ceasing generation of the attract signal.

19. An intelligent connection method, comprising: a first connector, upon one or more of: receiving a request to connect or a request to broadcast connector or device identification, sensing a connector attractor force, sensing a connector within a pre-determined distance, sensing a physical attempt to connect from a second connector, device, sensing physical handling of said connector;
performing a connection match,
detecting an unauthorized connector or a security breach, based upon a predefined connector security protocol, performing a security procedure including: turning on repel mechanism toward said second connector, changing its pin or connection configuration, retracting its connecting pins, changing its physical properties or orientation, or a combination thereof,
thereby prohibiting forming a physical connection to said connector.

20. The method of example 19 wherein said method prohibiting data or connection breach by rendering said connector's physical connectivity inoperable.

21. The method of any of examples 19-20 wherein said connector security protocol is dynamically variable.

22. The method of any of examples 19-21 wherein one or more of said connector is a stand-alone connector component, a device having a discrete and attached connector component or a device having an integrated connector component.

23. An intelligent connection system, comprising:
a first connector,
a housing;
a plurality of connector pins supported within the housing;
one or more sensors supported by the housing:
wherein said first connector is configured to:
perform a connection match;
detect an unauthorized connector or a security breach;
based upon a predefined connector security protocol, perform a security procedure including: turning on repel mechanism toward a second connector, change its pin or connection configuration, retract its connecting pins, change its physical properties or orientation, or a combination thereof,
thereby prohibiting forming a physical connection said second connector, wherein said connection match is performed upon one or more of:
receiving a request to connect or a request to broadcast connector or device identification, sensing a connector attractor force, sensing a connector within a pre-determined distance, sensing a connector within a pre-determined time period in the proximity of the first connector, sensing a physical attempt to connect a second connector or device.

24. The system of example 23 wherein prohibiting data or connection breach is performed by rendering said connector's physical connectivity inoperable.

25. The system of any of examples 23-24 wherein said connector security protocol is dynamically variable.

26. The system of any of examples 23-25 wherein one or more of said connectors is a stand-alone connector component, a device having a discrete and attached connector component or a device having an integrated connector component.

27. The system of any of examples 23-26 further comprising circuitry to detect a mating connector moving away from the intelligent connector and raise an alert if the mating connector has moved away further than a pre-determined distance.

28. An intelligent system, the system comprising:
a mobile device with optional detachable components, one or more attractor modules:
wherein one or more of said mobile device or its detachable components optionally include an attractor module;
wherein upon specific events detected by said mobile device, the device or its detachable modules are attracted to one of said corresponding attractor modules;
wherein said detection includes one or more of command signal, visual, distance or auditory detection or recognition;
wherein said attractor modules are placed within a pre-determined distance from said mobile device or at a predetermined physical coordinates with respect to said mobile device;
wherein said components with attract and repel forces are turned on continuously or turned off upon meeting certain conditions or contained within an enclosure enabling their forces be in operation only upon automatic retraction of said enclosures.

29. An autonomous connection method comprising:
establishing an attraction force among two components, wherein the first component is configured to align its orientation with respect to the second component and the first component abuts its connection points or pins to those connection points or pins of the second component responsive to the attraction force:

forming a secure physical connection among the first and the second components, wherein said attraction commences upon:
receiving an attract signal by the first component from the second component;
generating an attract signal by the first component responsive to receiving an attract signal from another component or a network.

30. The method of example 29 wherein one or more of said components is a stand-alone connector component, a device having a discrete and attached connector component or a device having an integrated connector component.

31. The method of any of examples 29-30 wherein said attract signal is generated by detecting a matching connector within a specified distance.

32. The method of example 31 wherein the specified distance is a dynamically variable distance.

33. The method of any of examples 29-32 wherein said attract signal is generated by detecting a matching connector within a specified distance for a duration exceeding a specified time duration.

34. The method of example 33 wherein the specified time duration is dynamically variable.

35. The method of example 33 wherein the specified time is dynamically variable.

36. The method of any of examples 29-35 wherein said physical connection is performed in an automated way, enabling hands-free operation for connect and disconnect operations.

37. The method of any of examples 29-36 wherein both connectors recognize each other and generate cooperative attract forces.

38. The method of any of examples 29-37 wherein the connectors and pins are coded.

39. The method of any of examples 29-38 and further comprising performing voice recognition and generating the attract signal responsive to a voice being recognized.

40. The method of any of examples 29-39 and further comprising performing a visual recognition of a connector and generating the attract signal responsive to the visual recognition.

41. An autonomous connection method comprising:
a first component generating visual, sensory, or gathering or receiving component identification, information of a second component;
performing verification of a possible match of the said second component information by said first component by matching the visual or other sensory or look-up of coding information;
upon said verification, commencing an autonomous, hands-free connection method by forming a secure physical connection among said two components without human intervention.

42. The method of example 41, wherein said autonomous connection method comprises:
establishing an attraction force among two components, wherein the first component, aligns its orientation with respect to the second component, the first component abutting its connection points or pins to those connection points or pins of the second component; and
forming a secure physical connection among the first and the second components, wherein said attraction commences upon:
receiving of an attract signal by the first component from the second component; and
generation of an attract signal by the first component or receiving an attract signal by the first component from another component or a network.

43. The method of example 42 and further comprising:
detecting that a secure physical connection has been made; and
ceasing generation of the attract signal.

44. The method of example 42 wherein the attract signal is electromagnetic.

45. The method of example 42 wherein the attract signal is ferromagnetic and disposed on both the first component and the second component, and wherein the method further comprises generating a repelling force when the first and second components are incorrectly aligned.

46. The method of any of examples 42-45 wherein the attract signal is provided by magnetic properties of the connection points or pins.

47. The method of example 46 wherein the magnetic properties of the connection points or pins is provided by a magnetic coating on the connection points or pins.

48. An intelligent connection method comprising:
broadcasting, via a first component connector, connector identification or device identification information;
receiving or capturing, via a second component connector, the broadcast connector identification or device information;
performing a connection matching; and
upon verifying a match with the first connector:
initiating an automated connection procedure among first and second component connectors;
establishing a physically secure connection between said two component connectors; and
wherein said broadcasting or receiving of connector or device identification is periodic, confined to a short broadcast distance, and is performed upon receiving an identification broadcast request or a combination thereof.

49. The method of example 48 wherein performing a connection matching is performed via sensing, a local look-up table, or a network look-up table.

50. An intelligent connector, comprising:
a first connector configured to receive a request to connect, a request to broadcast connector, or a device identification upon sensing a connector attractor force or upon sensing a physical attempt to connect from a second connector, device or physical handling, based upon a predefined and dynamically programmable connector security protocol, performing one or more security procedures including:
turning on a repel mechanism toward said second connector;
changing a pin or connection configuration of the first connector; and
changing physical properties or orientation of the first connector, thereby prohibiting forming a physical connection to said first connector.

51. The method of example 51 wherein said first connector prohibits data or connection breach by destroying said connector rendering its physical connectivity 52. An intelligent connector, comprising:
a housing;
a plurality of connector pins supported within the housing; and
a magnet supported by the housing and having a polarization compatible with a polarization of a mating connector.

53. The intelligent connector of example 52 and further comprising circuitry to control the magnet responsive to a request to connect the intelligent connector with the mating connector.

54. The intelligent connector of any of examples 52-53 wherein the magnet comprises multiple magnets disposed on the housing and having a polarization compatible with multiple magnets disposed on the mating connector such that the magnets repel each other when the connector and mating connector are not properly aligned, and attract each other when properly aligned.

55. The intelligent connector of example 54 wherein the multiple magnets provide attracting and repelling forces to self-orient the connector with the mating connector.

56. The intelligent connector of any of examples 52-55 and further comprising a latch operable to secure a connection between the connector and mating connector.

57. The intelligent connector of any of examples 52-56 and further comprising circuitry to sense and broadcast a location of the intelligent connector.

58. The intelligent connector of any of examples 52-57 and further comprising circuitry to sense a duration of time that the connector is held near the mating connector and control the magnets to initiate connection force response to such sensed duration of time.

59. The intelligent connector of any of examples 52-58 and further comprising circuitry to modify physical characteristics of the pins responsive to improper attempts to connect an unauthorized connector.

60. The intelligent connector of any of examples 52-59 and further comprising circuitry to receive a voice request to connect to a mating connector.

61. The intelligent connector of any of examples 52-60 and further comprising circuitry to detect a mating connector moving away from the intelligent connector and raise an alert if the mating connector has moved away further than a selected distance.

62. The intelligent connector of any of examples 52-61 and further comprising circuitry to locate parts of a system in the form of a detached module.

63. The intelligent connector of any of examples 52-61 wherein the magnet comprises multiple magnets disposed on the connector pins and having a polarization compatible with multiple magnets disposed on the mating connector such that the magnets repel each other when the connector and mating connector are not properly aligned, and attract each other when properly aligned.

64. The intelligent connector of any of examples 52-63 and further comprising circuitry to visually recognize a mating connector and control the magnets responsive to such recognition such that the magnets provide force when recognized.

65. The intelligent connector of any of examples 52-64 wherein the intelligent connector is integrated into a base unit, and wherein the mating connector comprises a module to connect to the base unit.

66. An intelligent connector, comprising:
a housing;
a plurality of connector pins supported within the housing; and
wherein the connector pins are electrically charged in solid, fluid, or gaseous media.

67. An intelligent connector, comprising:
circuitry to receive a request to connect;
a repel mechanism responsive to the received request to connect;
means for changing a pin or connection configuration of the first connector responsive to the request; and
means for changing physical properties or orientation of the first connector, thereby prohibiting forming a physical connection to said first connector.

What is claimed is:

1. An intelligent connection system, the system comprising:
a first component including a first connector;
a housing;
a plurality of connector pins supported within the housing; and;
a second component including a second connector;
wherein said system is configured to:
broadcast connector identification information via a first component connector;
receive, capture or sense said identification information via a second component connector;
perform a connection match, and upon verifying a match between said first connector and said second connector:
initiate an autonomous connection procedure among said first and said second component connectors; and
establish a physical connection between said two component connectors,
wherein said connection matching is performed using visual, sensory or look-up of connector identification information locally or on a network; and
wherein said autonomous connection procedure is performed without user's physical intervention.

2. The system of claim 1, wherein said broadcasting or receiving of connector identification is periodic, confined to a short broadcast distance, upon receiving a request or a combination thereof.

3. The system of claim 1, wherein the first and second components are configured to perform said autonomous connection by establishing an attraction force among two components, wherein:
the first component aligns its orientation with respect to the second component; and
the first component abuts its connection points or pins to those connection points or pins of the second component, forming a secure physical connection among the first and the second components.

4. The system of claim 1, wherein said autonomous connection procedure includes said system to detect the location of said connectors.

5. The system of claim 3, wherein upon forming a secure physical connection, said system ceases the generation of said attraction force.

6. The system of claim 1, wherein one or more of said connectors is a stand-alone connector component, a device having a discrete and attached connector component or a device having an integrated connector component.

7. The system of claim 1, wherein said system, upon performing a connection match:
detects an unauthorized connector or a security breach; and
performs a security procedure, based upon a predefined connector security protocol, including:
turning on a repel mechanism toward a second connector;
changing its pin or connection configuration;
retracting its connecting pins;
changing its physical properties or orientation; or
a combination thereof, thereby prohibiting forming a physical connection to said first connector.

8. An intelligent connection system, comprising:
a first connector,
a housing; and
a plurality of connector pins supported within the housing;
one or more sensors supported by the housing;

wherein said first connector is configured to:
perform a connection match;
detect an unauthorized connector or a security breach; and
perform a security procedure, based upon a predefined connector security protocol including:
turning on a repel mechanism toward a second connector;
changing its pin or connection configuration;
retracting its connecting pins; or
changing its physical properties or orientation, or a combination thereof,
thereby prohibiting forming a physical connection to said first connector, wherein said connection match is performed upon one or more of:
receiving a request to connect or a request;
sensing a connector attractor force; sensing a connector within a pre-determined distance;
sensing a connector within a pre-determined time-period in the proximity of the first connector; or
sensing a physical attempt to connect a second connector or device or combinations thereof.

9. The system of claim 8, wherein said prohibiting forming a physical connection includes rendering said connector's physical connectivity inoperable.

10. The system of claim 8, wherein said connector security protocol is dynamically variable.

11. The system of claim 8, wherein one or more of said connectors is a stand-alone connector component, a device having a discrete and attached connector component or a device having an integrated connector component.

12. The system of claim 8, further comprising circuitry to detect a mating connector moving away from the intelligent connector and raise an alert if the mating connector has moved away further than a pre-determined distance.

13. An intelligent system, the system comprising:
a mobile device with optional detachable components, one or more external modules;
wherein one or more of said mobile device or its detachable components optionally include an external or integrated module;
wherein upon specific events detected by said mobile device, the device or its detachable components perform an autonomous connection procedure;
wherein said autonomous connection procedure includes said device or its detachable components automatically connecting to one of said corresponding modules or automatically disconnecting from one of said corresponding modules;
wherein said autonomous connection procedure is performed without the user's physical intervention; and
wherein said detection includes one or more of command signal, visual, distance or auditory detection or recognition.

14. The system of claim 13, wherein said external module is an attractor module, and wherein said autonomous connection is performed by attraction force among said mobile device or its detachable components via said attractor modules.

15. The system of claim 14, wherein said modules with attract and repel forces are turned on continuously or turned off upon meeting certain conditions or contained within an enclosure enabling their forces to be in operation only upon automatic retraction of said enclosures.

16. The system of claim 13, wherein said external modules are placed within a predetermined distance from, or at a predetermined physical coordinate with respect to, said mobile device or its detachable components.

* * * * *

UNITED STATES PATENT AND TRADEMARK OFFICE
CERTIFICATE OF CORRECTION

| | |
|---|---|
| PATENT NO. | : 11,238,171 B1 |
| APPLICATION NO. | : 16/042835 |
| DATED | : February 1, 2022 |
| INVENTOR(S) | : Nasserbakht et al. |

It is certified that error appears in the above-identified patent and that said Letters Patent is hereby corrected as shown below:

In the Specification

In Column 5, Line 45, delete "brining" and insert --bringing-- therefor

In Column 6, Line 38, delete "brining" and insert --bringing-- therefor

In Column 14, Line 4, after "link.", delete a linebreak

In Column 18, Line 3, delete "housing:" and insert --housing;-- therefor

In Column 18, Line 41, delete "modules:" and insert --modules;-- therefor

In Column 18, Line 67, delete "force:" and insert --force;-- therefor

In the Claims

In Column 22, Line 7, in Claim 1, delete "and;" and insert --and-- therefor

Signed and Sealed this
Ninth Day of August, 2022

*Katherine Kelly Vidal*

Katherine Kelly Vidal
*Director of the United States Patent and Trademark Office*